US012200494B2

(12) United States Patent
Fellows

(10) Patent No.: US 12,200,494 B2
(45) Date of Patent: Jan. 14, 2025

(54) AI CYBERSECURITY SYSTEM MONITORING WIRELESS DATA TRANSMISSIONS

(71) Applicant: Darktrace Holdings Limited, Cambridge (GB)

(72) Inventor: Simon David Lincoln Fellows, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 242 days.

(21) Appl. No.: 17/571,142

(22) Filed: Jan. 7, 2022

(65) Prior Publication Data
US 2022/0225101 A1 Jul. 14, 2022

Related U.S. Application Data

(60) Provisional application No. 63/135,394, filed on Jan. 8, 2021.

(51) Int. Cl.
*H04L 9/40* (2022.01)
*H04L 41/16* (2022.01)
(Continued)

(52) U.S. Cl.
CPC .......... *H04W 12/122* (2021.01); *H04L 41/16* (2013.01); *H04L 41/22* (2013.01);
(Continued)

(58) Field of Classification Search
CPC ...... H04W 12/122; H04L 41/16; H04L 41/22; H04L 63/1416; H04L 63/1425; H04L 63/1433; H04L 63/1441; H04L 63/145
See application file for complete search history.

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Fog Intelligence for Network Anomaly Detection, by Ma et al., published 2019. (Year: 2019).*
(Continued)

*Primary Examiner* — Vu V Tran
(74) *Attorney, Agent, or Firm* — Rutan and Tucker, LLP

(57) ABSTRACT

A coordinator module, a cyber threat analyst module, and AI models trained to model a normal pattern of life for entities in a wireless domain and a normal pattern of life for entities in a second domain cooperate with a combination of wireless sensors with RF protocol adapters to monitor and analyze wireless activity and probes to monitor activity in the second domain in order to analyze an anomaly of interest in a wider view of another domain's activity. These modules and models understand and assess the wireless activity and the activity from the second domain in light of the AI models modelling the pattern of life for entities in a wireless domain and/or a in the second domain in order to detect a cyber threat indicated by at least by the anomaly of interest. A formatting model generates an alert and/or a report.

18 Claims, 13 Drawing Sheets

(51) Int. Cl.
*H04L 41/22* (2022.01)
*H04W 12/122* (2021.01)

(52) U.S. Cl.
CPC ...... *H04L 63/1416* (2013.01); *H04L 63/1425* (2013.01); *H04L 63/1433* (2013.01); *H04L 63/1441* (2013.01); *H04L 63/145* (2013.01)

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 7,843,322 B2 | 11/2010 | Zakrewski et al. |
| 7,890,869 B1 | 2/2011 | Mayer et al. |
| 8,312,540 B1 | 11/2012 | Kahn et al. |
| 8,661,538 B2 | 2/2014 | Cohen-Ganor et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,185,095 B1 | 11/2015 | Moritz et al. |
| 9,213,990 B2 | 12/2015 | Adjaoute |
| 9,348,742 B1 | 5/2016 | Brezinski |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,237,298 B1 | 3/2019 | Nguyen et al. |
| 10,268,821 B2 | 4/2019 | Stockdale et al. |
| 10,419,466 B2 | 9/2019 | Ferguson et al. |
| 10,516,693 B2 | 12/2019 | Stockdale et al. |
| 10,701,093 B2 | 6/2020 | Dean et al. |
| 2002/0174217 A1 | 11/2002 | Anderson et al. |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0077358 A1 | 3/2008 | Marvasti |
| 2008/0109730 A1 | 5/2008 | Coffman et al. |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0095374 A1 | 4/2010 | Gillum et al. |
| 2010/0107254 A1 | 4/2010 | Elland et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1* | 10/2015 | Bailor ............... G06F 21/45 726/6 |
| 2015/0319185 A1* | 11/2015 | Kirti ............... H04L 63/1416 726/23 |
| 2015/0341379 A1 | 11/2015 | Lefebvre et al. |
| 2015/0363699 A1 | 12/2015 | Nikovski |
| 2015/0373043 A1 | 12/2015 | Wang et al. |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0124071 A1 | 5/2016 | Baxley et al. |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0241576 A1 | 8/2016 | Rathod et al. |
| 2016/0352768 A1 | 12/2016 | Lefebvre et al. |
| 2016/0359695 A1 | 12/2016 | Yadav et al. |
| 2016/0373476 A1 | 12/2016 | Dell'Anno et al. |
| 2017/0054745 A1 | 2/2017 | Zhang et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0270422 A1 | 9/2017 | Sorakado |
| 2018/0027006 A1 | 1/2018 | Zimmermann et al. |
| 2018/0167402 A1 | 6/2018 | Scheidler et al. |
| 2019/0036948 A1 | 1/2019 | Appel et al. |
| 2019/0044963 A1 | 2/2019 | Rajasekharan et al. |
| 2019/0199756 A1* | 6/2019 | Correnti ............... H04W 12/08 |
| 2019/0251260 A1 | 8/2019 | Stockdale et al. |
| 2019/0260786 A1* | 8/2019 | Dunn ............... G06F 18/23 |
| 2020/0159624 A1* | 5/2020 | Malkov ............... G06N 20/00 |
| 2020/0280575 A1 | 9/2020 | Dean et al. |
| 2021/0120027 A1 | 4/2021 | Dean et al. |
| 2021/0157919 A1 | 5/2021 | Stockdale et al. |
| 2022/0303796 A1* | 9/2022 | Zhang ............... H04L 41/14 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Anomaly Detection in IP Networks, by Ji et al., published 2003. (Year: 2003).*

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

International Search Report and Written Opinion, PCT/US2022/011665, ISA:US, Apr. 8, 2022, 21 pp.

* cited by examiner

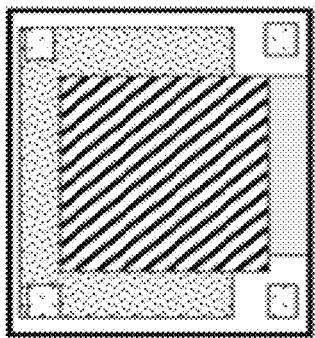
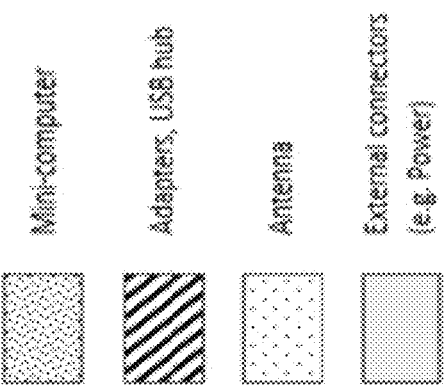
Figure 2C
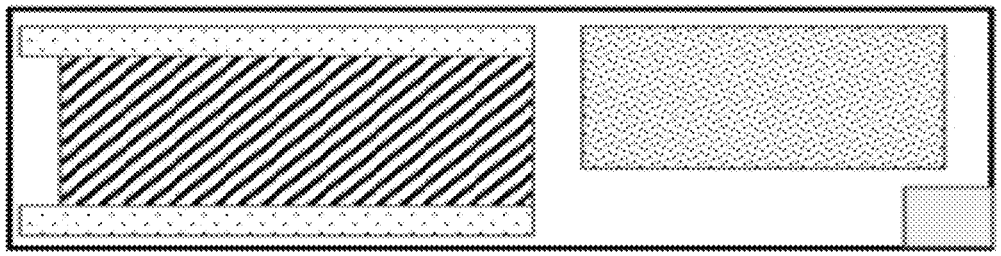
Figure 2B
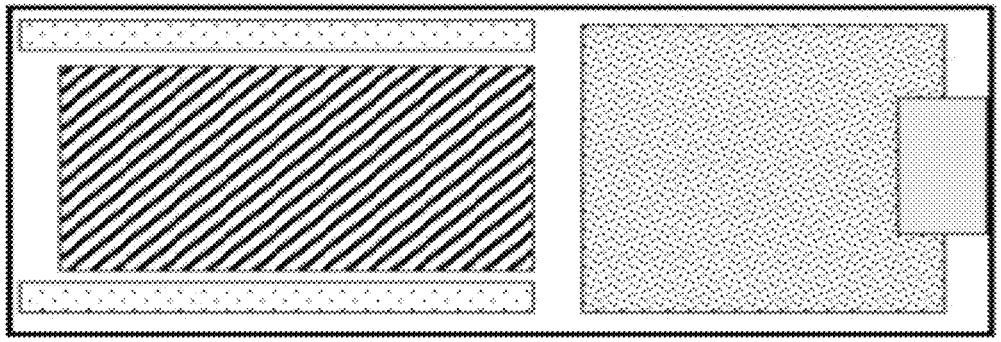
Figure 2A
Wireless Sensor 102

102

| Wireless Transmission Type | Example Monitoring Method |
|---|---|
| WiFi (2.4GHz and 5GHz channels) | WiFi adapter in Monitor mode |
| ZigBee and other mesh networks 2.4 GHz, 900 MHz and 868 MHz | ZigBee adapter in Monitor mode |
| 4G/5G/LTE 4G -600 MHz, 700 MHz, 1.7/2.1 GHz, 2.3 GHz, and 2.5 GHz 5G has two sets. Frequency range 1 (FR1) is from 450 MHz to 6 GHz, which includes the LTE frequency range. Frequency range 2 (FR2) is from 24.25 GHz to 52.6 GHz. | Software Defined RF adapter |
| Unknown radio | Software Defined RF adapter |

Figure 8

AI CYBERSECURITY SYSTEM MONITORING WIRELESS DATA TRANSMISSIONS

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATION

This application claims priority under 35 USC 119 to U.S. provisional patent application Ser. 63/135,394, titled "A CYBER SECURITY SYSTEM" filed Jan. 8, 2021, which the disclosures of such are incorporated herein by reference in their entirety.

FIELD

Cyber security and in an embodiment use of Artificial Intelligence in cyber security involving wireless data transmissions.

BACKGROUND

Some wireless cyber security monitoring attempts try to locate wireless devices via the use of fixed mounted sensors that use directional triangulation from their fixed locations, and typically employ a 'heat map' method on top.

SUMMARY

In an embodiment, an AI based cyber security appliance protects a system, including but not limited to a network, from cyber threats. The AI-based cyber security appliance can have at least the following components.

Methods, systems, and apparatus are disclosed for an Artificial Intelligence based cyber security system. The Artificial Intelligence based cyber security system can include an Artificial Intelligence based cyber security appliance, a set of two or more wireless sensors, a formatting model, a coordinator module, a cyber threat analyst module, and one or more Artificial Intelligence models trained to model a normal pattern of life for entities in a wireless domain, one or more Artificial Intelligence models are trained to a normal pattern of life for entities in a second domain. The modules and models of the Artificial Intelligence based cyber security appliance/platform can cooperate with a combination of 1) wireless sensors with one or more Radio Frequency protocol adapters to monitor and analyze wireless activity, including wireless transmissions transmitted through the airspace in the wireless domain, and 2) probes to monitor activity in the second domain. The second domain being monitored can include any of i) an Information Technology network, ii) an Operational Technology network, iii) a Cloud service, iv) a SaaS service, v) an endpoint device, and vi) an email domain in order to analyze at least an anomaly of interest in one of 1) the wireless activity from the wireless sensors in view of the activity in the second domain from the probes, 2) the activity from the second domain from the probes in view of the wireless activity in the wireless domain from the wireless sensors, and 3) any combination of both. This allows the coordinator module, the cyber threat analyst module, and the one or more Artificial Intelligence models to cooperate to analyze the anomaly of interest in a wider view of another domain's activity.

The coordinator module and the cyber threat analyst module are configured to cooperate to understand and assess the wireless activity supplied from the wireless sensors as well as the activity from the second domain supplied from the probes from the second domain in light of (e.g., compared against) the one or more Artificial Intelligence models trained to model a normal pattern of life for entities in a wireless domain and a normal pattern of life for entities in a second domain in order to detect a cyber threat indicated by at least by the anomaly of interest. The formatting model can generate at least one of i) an alert to a user interface of the cyber security appliance and/or a device associated with a user and ii) a report that includes details of activities assessed to be relevant activities to the anomaly of interest to the user when the possibility of the cyber threat is above a threshold based upon input from the cyber threat analyst module. Note, the report and assessments will at least include an anomaly of interest plus other relevant factors. The formatting model is configured to deliver the alert and/or the report via a medium of at least one of 1) a printable report, 2) presented digitally on the user interface, 3) presented digitally in an email on a display, 4) presented digitally in a message (e.g. text message, iChat, etc.) on the display, and 5) in a machine readable format for further reinforcement of machine learning.

These and other features of the design provided herein can be better understood with reference to the drawings, description, and claims, all of which form the disclosure of this patent application.

DRAWINGS

The drawings refer to some embodiments of the design provided herein in which:

FIG. 2A illustrates a front side view of an embodiment of a wireless sensor.

FIG. 2B illustrates a side view of an embodiment of a wireless sensor.

FIG. 2C illustrates a top down view of an embodiment of a wireless sensor.

FIG. 8 illustrates an embodiment of a table of an example of different wireless transmissions that can be monitored by the two or more Radio Frequency protocol adapters cooperating with the wireless receivers' bandpass filters and antennas.

Figure 1:
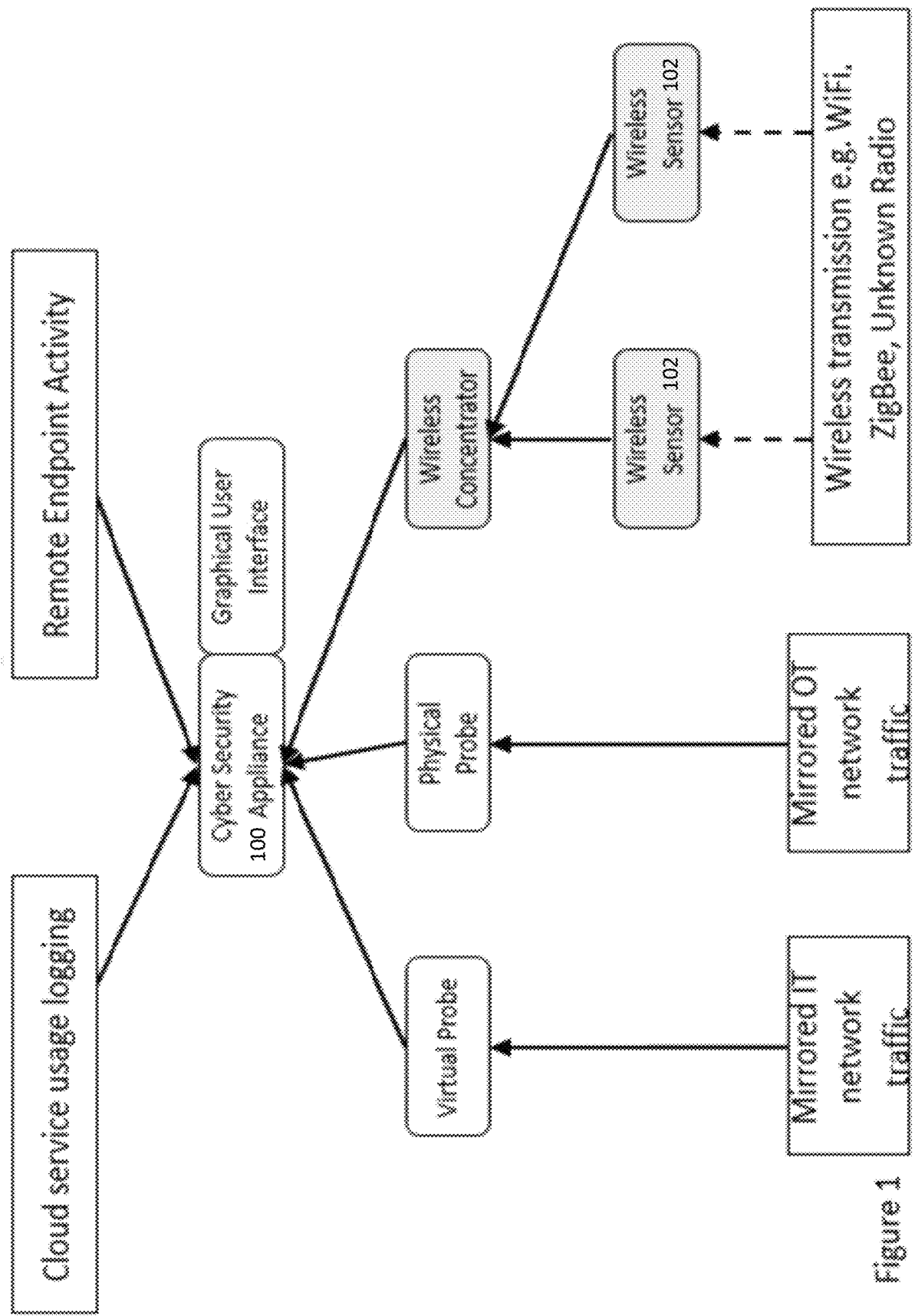
FIG. 1 illustrates an embodiment of a block diagram of an example Artificial Intelligence based cyber security system with wireless monitoring.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

FIG. 1 illustrates an embodiment of a block diagram of an example Artificial Intelligence based cyber security system with wireless monitoring.

The Artificial Intelligence based cyber security system can include some example components such as a cyber security appliance 100 with a graphical user interface, one or more virtual probes monitoring a Cloud service, a SaaS service, an endpoint agent monitoring endpoint activity, etc., one or more physical probes monitoring and mirroring Information Technology network traffic and mirroring Operational Technology network traffic, a wireless concentrator connected to one or more wireless sensors 102 monitoring wireless activity including wireless transmissions (e.g., WiFi, ZigBee, suspicious (e.g., unknown) Radio Frequency signals) and other components, a formatting model, one or more Artificial Intelligence models trained to understand and assess the wireless activity from the wireless sensors 102 as well as the activity from at least another domain from the probes from the other domain in order to detect a cyber threat. Generally, each Artificial Intelligence model will be trained and tailored (and then deployed) to understand and assess activity from a particular domain.

The coordinator module, a cyber threat analyst module, and one or more Artificial Intelligence models trained to model a normal pattern of life for entities in a wireless domain and a normal pattern of life for entities in a second domain are configured to cooperate with a combination of 1) wireless sensors 102 with one or more Radio Frequency protocol adapters to monitor and analyze wireless activity, including wireless transmissions transmitted through airspace in the wireless domain, and 2) probes to monitor activity in the second domain. One or more domains can be monitored and compared to the wireless activity including any of i) an Information Technology network, ii) an Operational Technology network, iii) a Cloud service, iv) a SaaS service, v) an endpoint device, vi) an email domain, and vii) any combination of these in order to analyze at least an anomaly of interest in one of 1) the wireless activity from the wireless sensors 102 in view of the activity in the second domain from the probes, 2) the activity from the second domain from the probes in view of the wireless activity in the wireless domain from the wireless sensors 102, and 3) any combination of both. This allows the coordinator module, the cyber threat analyst module, and the one or more Artificial Intelligence models to cooperate to analyze the anomaly of interest in a wider view of another domain's activity. (Also see FIG. 9 for example modules and AI models of a cyber security appliance)

The coordinator module and the cyber threat analyst module can cooperate to understand and assess the wireless activity from the wireless sensors 102 as well as the activity from other domains supplied from the virtual and/or physical probes monitoring the other domain. The coordinator module and the cyber threat analyst module can cooperate to understand and assess the wireless activity in light of the one or more Artificial Intelligence models trained to model a normal pattern of life for entities in a wireless domain and a normal pattern of life for entities in a second domain, a third domain, etc., in order to detect a cyber threat indicated by at least by the anomaly of interest identified in one of the domains. Note, the assessments will at least include an anomaly of interest detected plus other relevant factors. The coordinator module cooperating with one or more Artificial Intelligence models can detect anomalies and analyze them with other factors within the same domain and external to that domain. Anomalies can be checked to see what possible relations they have to each other in any of the domains and across the domains as well as with any other relevant factors.

Generally, a domain module will be coded to specifically understand and assess activities, entities, protocols, etc. to that particular domain, such as an Information Technology domain. The domain module and/or coordinator module can potentially include an Artificial Intelligence model that is trained (and then deployed) to understand and assess activity from that particular domain.

The coordinator module, the cyber threat analyst module, and one or more Artificial Intelligence models trained to model a normal pattern of life for entities in a wireless domain and a normal pattern of life for entities in a second domain can analyze anomalies along with additional factors in 1) the wireless activity from the set of wireless sensors 102 and/or activity in the other domains in view of each other. The one or more Artificial Intelligence models can be trained with supervised learning and/or a combination of unsupervised learning to understand and model a normal pattern of life for entities in a wireless domain, a normal pattern of life for entities in a second domain, a normal pattern of life for entities in a third domain, etc. The one or more Artificial Intelligence models can be trained and then be deployed into the field in order to gauge a possibility of a cyber threat. The one or more Artificial Intelligence models can use unsupervised learning algorithms to update their training and modelling when deployed to model a pattern of life of each entity in the domain it's modelling as well as understand and assess the wireless activity from the wireless sensors 102 and the activity from the other domains from the probes.

The coordinator module has algorithms and can create, for example, directed graphs and/or vector diagrams to determine how links exist between the wireless activities that include alerts, events, and the suspicious wireless transmission, from the wireless domain to the activities that include alerts and events from the second domain, under analysis, supplied by the probes.

The one or more wireless sensors 102 can include an antenna with one or more different frequency detectors/receivers that are able to detect and receive Radio Frequency signals; and thus, monitor signals/communications occurring through the airspace versus signals captured by the hotspot and then fed to a wire based conductor. The wireless sensor uses one or more Radio Frequency protocol adapters that pulls down raw data information from the airspace as well as then makes an initial metadata analysis. Some examples of raw/metadata collected and stored by the wireless sensor: signal strength (at each receiving wireless sensor), WiFi protocol type (e.g. 802.11), events (beacon, probe, authenticate, data frame, etc.), sending/receiving MAC addresses. The frequency detector and receiver via use of multiple radio receivers are able to detect and receive radio signals from 20 kHz to around 300 GHz, and generally have some Radio Frequency protocol adapters set out to collect multiple Radio Frequency protocols (e.g., filter for specific Wi-Fi frequencies at 2.4 GHz and 5 GHz), and then feed any retrievable data and/or metadata (e.g., connecting to a local router, a MAC address, a SSID connection ID, etc.) from those signals to the centralized portion of the Artificial Intelligence based cyber security system, which is the cyber security appliance 100. In an example, a first radio receiver and a first Radio Frequency protocol adapter can cooperate to read a specific protocol and narrowly focused on the related frequency ranges.

Downstream, the wireless concentrator can concentrate the information from multiple wireless sensors 102 for network bandwidth reasons as well as network security reasons by putting an edge device (e.g., the wireless concentrator) between the core of the cyber security appliance 100 and limit outside access directly into that cyber security appliance 100. Thus, the wireless concentrator eliminates a physical port which goes directly into the cyber security appliance 100 as well as removes direct network access to the cyber security appliance 100 from physically insecure areas (which might not use a physical port).

The modules of the cyber security appliance 100 modules cooperate through the coordinator module to communicate with each other to monitor both 1) signals/communications occurring on a wire based conductor in a network (e.g., IT network), within an endpoint device, in virtual environments (e.g., SaaS, cloud), as well as 2) those being transmitted through the air. Wireless transmissions (for example WiFi, ZigBee, and unknown radio frequencies) are monitored, raw and metadata about them is gathered centrally, and they are analyzed by the AI algorithms in the AI models along with other data sources for interesting activity to identify at least an anomaly of interest. The AI algorithms in the AI models analyze for activity including anomalies that are of interest through mainly unsupervised AI algorithms (supported by other types of AI) to extract occurrences within the wireless activity and that are of interest to an information security team.

The cyber security appliance 100 can contain one or more AI models to model a normal pattern of life of each domain being monitored.

Again, the one or more Artificial Intelligence models are trained to analyze the combination of wireless activity, including wireless transmissions transmitted through airspace, with other data sources as part of a wider cyber security platform, with the AI trained to examine the combined data set of activity including anomalies that are of interest occurring in any of the multiple different domains. Examples of other data sources/domains under analysis include mirrored IT network traffic, mirrored OT network traffic, Cloud service with usage logging, Remote Endpoint Activity, Email Activity, and any combination of these, all via different types of probes configured specifically to monitor activity within that domain. These multiple different domains act as data sources to provide information on activities both normal and unusual to analyze for stealthy advanced persistent cyber threats and/or coordinated attacks across multiple domains from an advanced persistent cyber threat for an organization with these multiple domains. For example, if a user is browsing shopping websites, and then switches their smart phone to be a WiFi hotspot, the endpoint agent on the smart phone may be able to detect both the user's change to put the smart phone into being a WiFi hot spot in the wireless domain and if new IT communications are going to an internet URL associated with shopping in the IT network domain, then that activity, although not normal, may not (when analyzed in combination with the activity from another domain) be considered as suspicious. However, if a user switches their smart phone to be a WiFi hotspot in the wireless domain and now is moving large amount of files via Dropbox, email, etc. deemed to contain sensitive information, then an alert would almost certainly be generated, then based on the content of those files as detected in the IT network domain, then a possible autonomous response might be taken by the autonomous response module.

Note, one or more anomalies of interest can come from one or more suspicious wireless transmissions in the airspace from at least one of 1) transmitted from a wireless transmitter device, which was not known previously to the Artificial Intelligence models trained to model a normal pattern of life for entities in the wireless domain, and 2) transmitted from a known wireless transmitter device, which is known previously to the Artificial Intelligence models trained to model the normal pattern of life for entities in the wireless domain but is interacting with a wireless network that is not normally part of the wireless domain being protected by the cyber security system (e.g. a corporate wireless device that normally communicates with the corporate wireless network starting to interact with a non-corporate network), 3) transmitted in a frequency range not within a frequency range associated with one or more of the Radio Frequency protocol standards, (such as WiFi, ZigBee, 5G, etc.), known by the Artificial Intelligence models trained to model the normal pattern of life for entities in the wireless domain (e.g. transmitted in a radio frequency range that is not within any frequency range used by the many different Radio Frequency protocol standards); and 4) transmitted in the frequency range from the wireless transmitter device within a frequency range associated with the Radio Frequency protocol standard, (such as 2.4 GHz for WiFi), known by the Artificial Intelligence models trained to model a normal pattern of life for entities in the wireless domain but not formatted in the Radio Frequency protocol standard (e.g., not formatted in the WiFi protocol) associated with that transmitted frequency range, and 5) any combination of these. Thus, the wireless transmitter device may be new to the wireless network and not previously been seen by the AI models modelling the normal behavior of entities in the wireless domain before. Likewise, standard Radio Frequency protocols, for example, WiFi, are known to have standard transmission frequencies of, for example, 2.4 GHz and 5 GHz. Thus, either a transmission of a WiFi protocol at 1 GHz or a wireless transmission at 2.4 GHz but not formatted in a WiFi protocol would be analyzed as an anomaly of interest.

Also, the modules (some containing AI models) of the centralized Artificial Intelligence based cyber security appliance 100 detect for anomalies in the data, metadata, and/or in the frequency signals into or out of the Wi-Fi network—for example. The presence of an anomalous (e.g., new) frequency to the Wi-Fi network and/or the presence of a new/unknown device repeatedly attempting to connect to the Wi-Fi network via the hotspot. The system can detect the anomaly based on AI modelling a pattern of life for each of the domains and then detecting what is abnormal for the pattern of life in a specific domain. The AI model, by modelling behavior activity of entities in the wireless domain, can determine what is a normal wireless signal in the corporation's wireless network and what is new or potentially malicious by keeping track of metadata which provides metric of interest and events of interest to find things that stand out or things AI model modelling the normal pattern of life finds unusual compared to that normal pattern of life, as well as use a pre-identified list of examples that something is particularly interesting, and generally a combination of the two.

Some examples of possible interesting detections from the AI models modelling a particular organization's wireless domain's pattern of life:

A corporate device known to the AI model modelling a particular domain's pattern of life has connected to an unusual wireless network not previously encountered by the AI model modelling a particular domain's pattern of life and/or a network already identified as a bad wireless network, suspicious wireless network, or wireless network not under the control of the organization.

A corporate device known to the AI model modelling a particular domain's pattern of life is probing for unusual wireless network not previously encountered by the AI model modelling a particular domain's pattern of life or a network already identified as a bad wireless network, suspicious wireless network, or wireless network not under the control of the organization.

Corporate access point is beaconing a new wireless network or unusual wireless network not previously encountered by the AI model modelling a particular domain's pattern of life or a network already identified as a bad wireless network, suspicious wireless network, or wireless network not under the control of the organization.

A non-corporate device either not previously encountered by the AI model modelling a particular domain's pattern of life or already known as a bad wireless device or suspicious wireless device, or wireless device not under the control of a user of the organization is now probing a corporate wireless network under the control of the organization.

A corporate device known to the AI model modelling a particular domain's pattern of life talks to unknown wireless networks within your building, for laptops, endpoint agents might be able to tell you this, but for printers, that is not possible.

Thus, the modules of the cyber security appliance 100 cooperate with each other and use of the portable hunter, for example, to identify unknown devices that are talking to your corporate wireless network within your building, and then what is that wireless device and more importantly where that wireless device is located.

Thus, the modules of the cyber security appliance 100 cooperate, for example, to identify a device in the wireless network in your building from a supplier that unexpectedly makes unknown radio transmissions.

New frequencies can be an anomaly. This type of data of new frequencies in the air, or connecting to unexpected networks, etc. would not be observed on the conductor wire.

When the contents of the transmissions are parseable by the wireless sensors 102, for example, in an implementation for WiFi and/or ZigBee protocols, the wireless sensor can provide data regarding the devices connecting to a signal source or other signal sources nearby. Note, when the contents of the transmissions are not parseable for their content and/or metadata, the mere presence of new transmission frequencies can indicate an anomaly.

The formatting module of an Artificial Intelligence based cyber security appliance 100 after the detection, then also generates a notice to the operator.

Note, alerts generated by the formatting module cooperating with the AI models can be created based upon defined model logic. The formatting module generates the alert to the user whenever the anomaly of interest is a suspicious wireless transmission in the airspace.

Again, once an alert or other report is generated, then other actions can be taken. One or more probes, such as an antenna with a frequency detector and receiver can be contained within a mobile handheld portable hunter device 104. The operator can use a mobility aspect of the handheld portable hunter device 104 with its antenna to locate the source of the anomalous signal or connection. The handheld portable hunter device 104 can find an offending device via tracing signal strength without a need to map the environment. The signal strength of the anomalous signal or connection increasing in strength could indicate that the handheld hunting device is getting closer to the device causing the anomalous signal or connection. The portable hunter device 104 can also be used to determine the likely direction of the signal source.

Thus, the modules of an Artificial Intelligence based cyber security appliance 100 can then detect and alert on the presence of unusual devices to the Wi-Fi networks. The modules of an Artificial Intelligence based cyber security appliance 100 can also detect and alert on a known device associated with the Wi-Fi network of the organization now instead connecting to an unexpected (not the organization's) Wi-Fi network in range.

FIGS. 2A-2C illustrate an embodiment of a block diagram of an example hardware layout for a wireless sensor.

FIG. 2A illustrates a front side view of an embodiment of a wireless sensor. FIG. 2B illustrates a side view of an embodiment of a wireless sensor. FIG. 2C illustrates a top down view of an embodiment of a wireless sensor.

An example wireless sensor 102 may have components such as a mini-computer including one or more algorithms, a memory, and one or more processors, one or more Radio Frequency protocol adapters, each configured to detect for a different protocol and frequency range, a USB hub that allows both a mechanism to communicate with the wireless sensor 102 and a mechanism to charge a battery if one exists, one or more antennas, and external connectors (e.g., AC Power plug), a transmitter/output communications module.

The multiple Radio Frequency protocol adapters and multiple antennae can be used to:

Monitor multiple different wireless transmission types, monitor multiple different Radio Frequency ranges, and monitor and understand multiple different Radio Frequency protocols.

Monitor multiple channels within the same transmission type simultaneously (e.g., WiFi on 2.4 GHz and 5.0 GHz) with two Radio Frequency protocol adapters each tailored to the specific channel within that transmission type—

The transmitter (at least one of a wireless transmitter as well as a wired Ethernet communication circuit and ports) is configured to communicate its own data back to the wireless concentrator.

Each wireless sensor 102 can have two or more Radio Frequency protocol adapters in order to be able to monitor wireless transmissions in an airspace consisting of various types of wireless transmissions both 1) a type of wireless transmissions in a known Radio Frequency protocol at a standard frequency range dictated by that Radio Frequency protocol (such as WiFi at 2.4 GHz and 5.0 GHz) through to 2) another type of wireless transmissions of a Radio Frequency but i) just not in the standard frequency range utilized by that known protocol and/or ii) in the standard frequency range for a first known Radio Frequency protocol but not formatted in the first known Radio Frequency protocol. These types of wireless transmissions are merely observable through the antenna of the wireless sensor 102 detecting an existence of the Radio Frequency transmission but the set of Radio Frequency protocol adapters in that wireless sensor 102 cannot decipher the contents of the Radio Frequency transmission or even the header data for the protocol being used in that Radio Frequency transmission.

The set of the two or more Radio Frequency protocol adapters in the wireless sensor 102 can include two or more Radio Frequency protocols from i) a WiFi protocol transmitted on 2.4 GHz channel, ii) a WiFi protocol transmitted on and 5 GHz channel, iii) a ZigBee or other mesh network protocol transmitted on a 2.4 GHz channel, iv) a ZigBee or other mesh network protocol transmitted on a 900 MHz channel, v) a ZigBee or other mesh network protocol transmitted on a 868 MHz channel; vi) a 4G protocol transmitted on a 600 MHz channel, vii) a 4G protocol transmitted on a 700 MHz channel, viii) a 4G protocol transmitted on a 1.7 GHz channel, ix) a 4G protocol transmitted on a 2.1 GHz channel, x) a 4G protocol transmitted on a 2.3 GHz channel, xi) a 4G protocol transmitted on a 2.5 GHz channel; xii) a 5G protocol in a first frequency range from 450 MHz to 6 GHz (which includes the LTE frequency range), xiii) a 5G protocol in a second frequency range from 24.25 GHz to 52.6 GHz, as well as, xiv) a Z-Wave protocol transmitted on an 800-900 MHz frequency range.

Each different Radio Frequency protocol adapter is configured both i) to understand one or more particular Radio Frequency protocols and ii) to have one or more frequency filters, Each Radio Frequency protocol adapter cooperates with one or more antennas in the wireless sensor 102 to capture the wireless transmissions in the one or more particular Radio Frequency protocols.

An example Radio Frequency protocol adapter is configured to understand for example a Wi Fi protocol such as 802.11a, 802.11ax, 802.11ac wave2, 802.11ac wave1, 802.11b, 802.11n, etc. and their corresponding Radio Frequency dictated by the standard e.g., 2.4 GHz and/or 5 GHz.

A wide spread of Radio Frequency protocol adapters allows monitoring of different wireless types of transmissions and use of lots of data sources within an organization's wireless domain. A wireless sensor 102 using a suite of two or more Radio Frequency protocol adapters allows monitoring of this wide variety of wireless transmissions within the same solution.

Note, wireless access points and other infrastructure in the wireless network of an organization use known protocols and frequency ranges. However, malicious devices can try to transmit wireless transmissions stealthily in the Radio Frequency range but just not in the format of known protocols and/or not in the standard frequency ranges utilized by the known protocols.

When a device transmits in a frequency and/or protocol unknown a priori to the AI models of the cyber security system, then the system may not have a direct way of obtaining information about the contents within the wireless transmissions (e.g., no ability to read the metadata or data inside the wireless transmission). However, the Artificial Intelligence based cyber security system can detect a frequency at which the wireless transmission occurs at, when the transmission occurred, a geographical area that transmission occurs within, as well as how strong/measured signal strength is the wireless transmission. The measured signal strength can give an indication of how far that unknown wireless transmission can reach.

Again, each wireless sensor 102 can have one or more Radio Frequency adapters that have wireless receivers to pull down raw data information from a wireless transmission in the airspace as well as then one or more algorithms, a memory, and one or more processors, configured to then make an initial metadata analysis via a deep packet inspection of the wireless transmission. The wireless sensor 102 has various algorithms to perform deep packet inspection on the wireless transmissions to dissect network data to evaluate both the data part and the header of a packet being sent through the airspace in order to create metadata. The metadata and some raw data about each wireless transmission can be sent to wireless concentrator from each of the wireless sensors 102 positioned around the airspace utilized by the organization. The metadata can contain information about the protocols a specific wireless transmission uses to create and send packets, telemetry of network connections including potentially a transit path of the packet in the wireless transmission, a source and destination of the packet in the wireless transmission, time associated with the packet in the wireless transmission, and other non-message content discussed herein. Note, a packet is being used in a general sense a formatted piece of structured data known as a "packet" that wraps/contains digital information in a cocoon of that structure as well as a header that identifies information such as the traffic's source and destination.

An example wireless sensor 102 may have physical dimensions such as a front side height by width of 300 mm by 120 mm, a side width of 80 mm and a top side depth of 80 mm.

Figure 3:
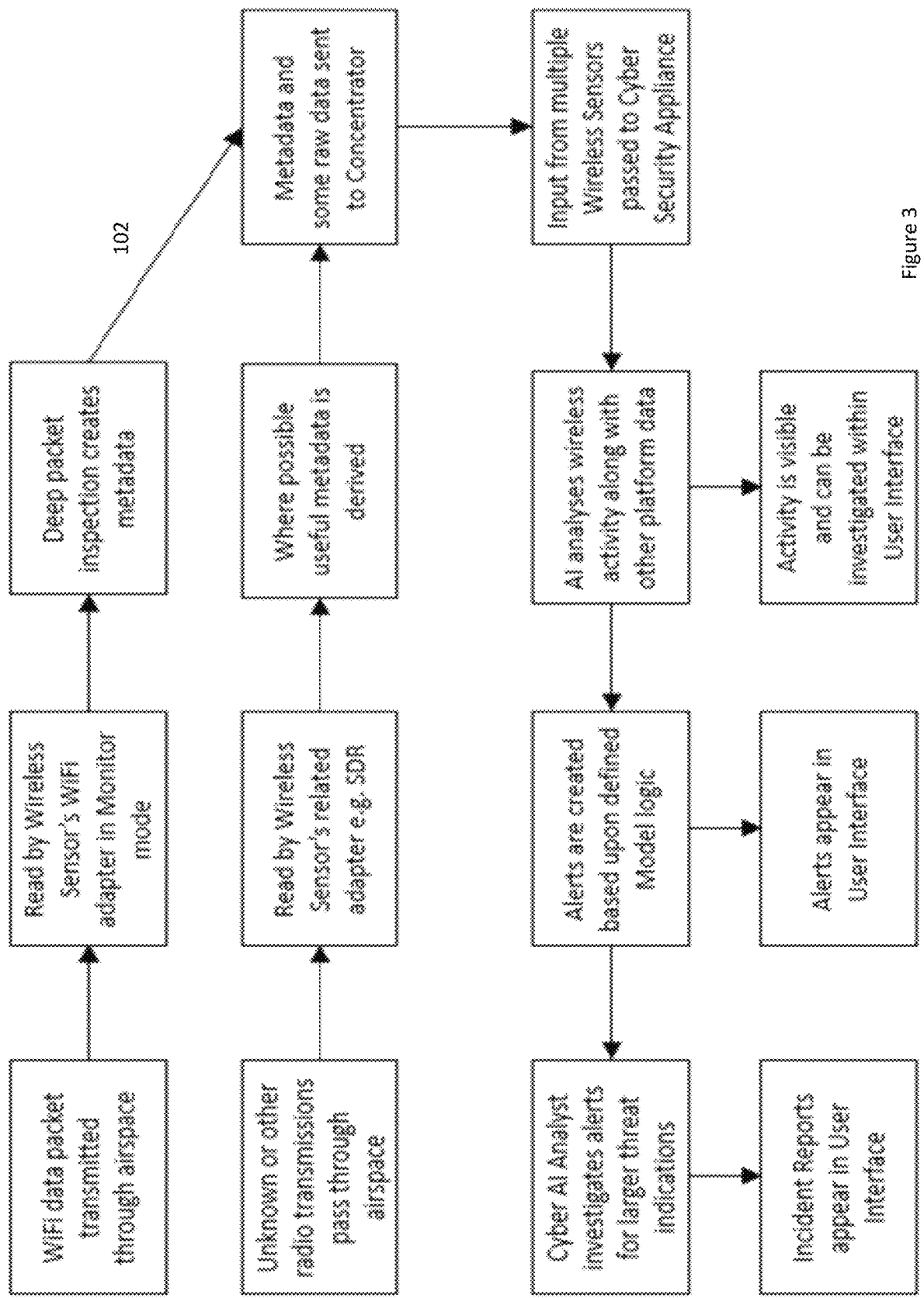
FIG. 3 illustrates an embodiment of a flow diagram of an example wireless monitoring and analysis by the modules of the Artificial Intelligence based cyber security appliance cooperating with the wireless sensors.

FIG. 3 illustrates an embodiment of a flow diagram of an example wireless monitoring and analysis by the modules of the cyber security appliance cooperating with the wireless sensors.

An example WiFi data packet is transmitted through airspace and picked up by the antenna and the corresponding WiFi bandpass filter in the Radio Frequency protocol adapter in the wireless sensor. The WiFi data packet is read by the wireless sensor's Radio Frequency protocol adapter for WiFi in monitor mode. Algorithms in the wireless sensor 102 perform a deep packet inspection that creates metadata. The communication module of the wireless sensor 102 sends the metadata and some raw data (if available) over to the wireless concentrator. Depending upon the signal strength of the example WiFi data packet being transmitted, the wireless concentrator may receive metadata and some raw data (if available) from multiple wireless sensors 102 regarding this example WiFi data packet being transmitted. Each wireless sensor 102 can convey a different signal strength measurement, but multiple detections of this WiFi data packet being transmitted are not necessary to obtain a geographic area that is the transmission source for this example WiFi data packet being transmitted. Also, typically wireless transmissions are occurring very often all of the time; and thus, the set of multiple wireless sensors 102 will generally be sending metadata and raw data about Radio Frequency transmission signals they are detecting, all occurring at about a same time. In essence a steady stream of wireless raw data and metadata will be sent to the wireless concentrator. Input from the multiple wireless sensors 102 can be condensed into the wireless concentrator and passed onto the cyber security appliance 100.

In another example, an unknown protocol or unknown Radio Frequency transmission is transmitted through the airspace monitored by the wireless sensors 102 and picked up by the antenna and the corresponding wide band and/or bandpass filters in the set of Radio Frequency protocol adapters in the wireless sensor. For example, the unknown protocol and/or unknown radio frequency is read by the wireless sensor's related adapter e.g., SDR. Even though the adapter is not able to read either the contents of that transmission and/or even the header of that transmission, the adapter still captures and provides possible useful metadata derived from that transmission. The communication module of the wireless sensor 102 sends the metadata over to the wireless concentrator. Depending upon signal strength of the unknown protocol or unknown Radio Frequency transmission being transmitted, the wireless concentrator may receive metadata from multiple wireless sensors 102 regarding the unknown protocol or unknown Radio Frequency transmission being transmitted, each with a different signal strength measurement. Again, input from the one or more wireless sensors 102 can be condensed into the wireless concentrator and passed onto the cyber security appliance 100.

The modules of the cyber security appliance 100 can obtain and process the metadata and raw data from the multiple wireless sensors 102 about all of the Radio Frequency transmissions occurring in the airspace covered by the organization's digital real estate.

The coordinator module, a cyber threat analyst module, and one or more Artificial Intelligence models trained to model a normal pattern of life for entities in a wireless domain and a normal pattern of life for entities in a second domain, a third domain, etc., to cooperate to understand and assess the wireless activity from the wireless sensors 102. The coordinator module can combine the analysis of the wireless activity along with/in light of other data from other networking domains such as IT, OT, SaaS, Cloud, email, etc. The results of the processing and analysis of the wireless activity by the coordinator module and the cyber threat analyst module compared against the one or more Artificial Intelligence models is presented onto a User Interface and can be further investigated within the other services presented on the User Interface.

A formatting model can generate alerts regarding the wireless activity based upon at least defined model logic. Alerts can be presented onto a User Interface and can be further investigated within the other services presented on the User Interface.

The cyber threat analyst module cooperates with, for example, one or more AI models trained on how human analysts conduct cyber investigations to conduct initial investigations regarding any anomaly of interest raised in the alert, then collects additional information to form a chain of potentially related/linked information under analysis from either prior wireless transmissions and/or data from other domains that have a probability above a threshold, such as greater than 40% related, of a logical nexus to the anomaly of interest and/or wireless transmission itself. The cyber threat analyst module is configured to cooperate with the one or more AI models trained on how the human cyber security analysts conduct cyber investigations to form one or more hypotheses on potential cyber threats that could have this chain of potentially related information under analysis. The cyber threat analyst module will perform several additional rounds of gathering additional information in order to refute or to support each of the one or more hypotheses to re-check cyber threat indications for the chain of potentially related information under analysis until the one or more hypotheses on potential cyber threats are one of refuted, supported, or included in the report that includes details of activities assessed to be relevant activities to the anomaly of interest to the user, and that also conveys at least a first hypothesis is neither supported nor refuted; and thus, needs a human to further investigate the anomaly of interest. A report of all alerts and their details over a reporting period of time can be generated. In addition, incident reports can be generated for hypotheses that are supported and the reasons why appear in user interface as a selectable report, and the information regarding hypotheses that have been refuted and the reasons why can also be retrieved via the user interface.

The AI based cyber security system, such as Darktrace Industrial and/or Darktrace Enterprise, can be used to protect the airspace and other Radio Frequency monitoring for wireless networks in an organization and wireless transmitter devices in a location such as an organization's premises, and other Wi-Fi usage where wireless sensors 102 are placed in the area being monitored.

Figure 4:
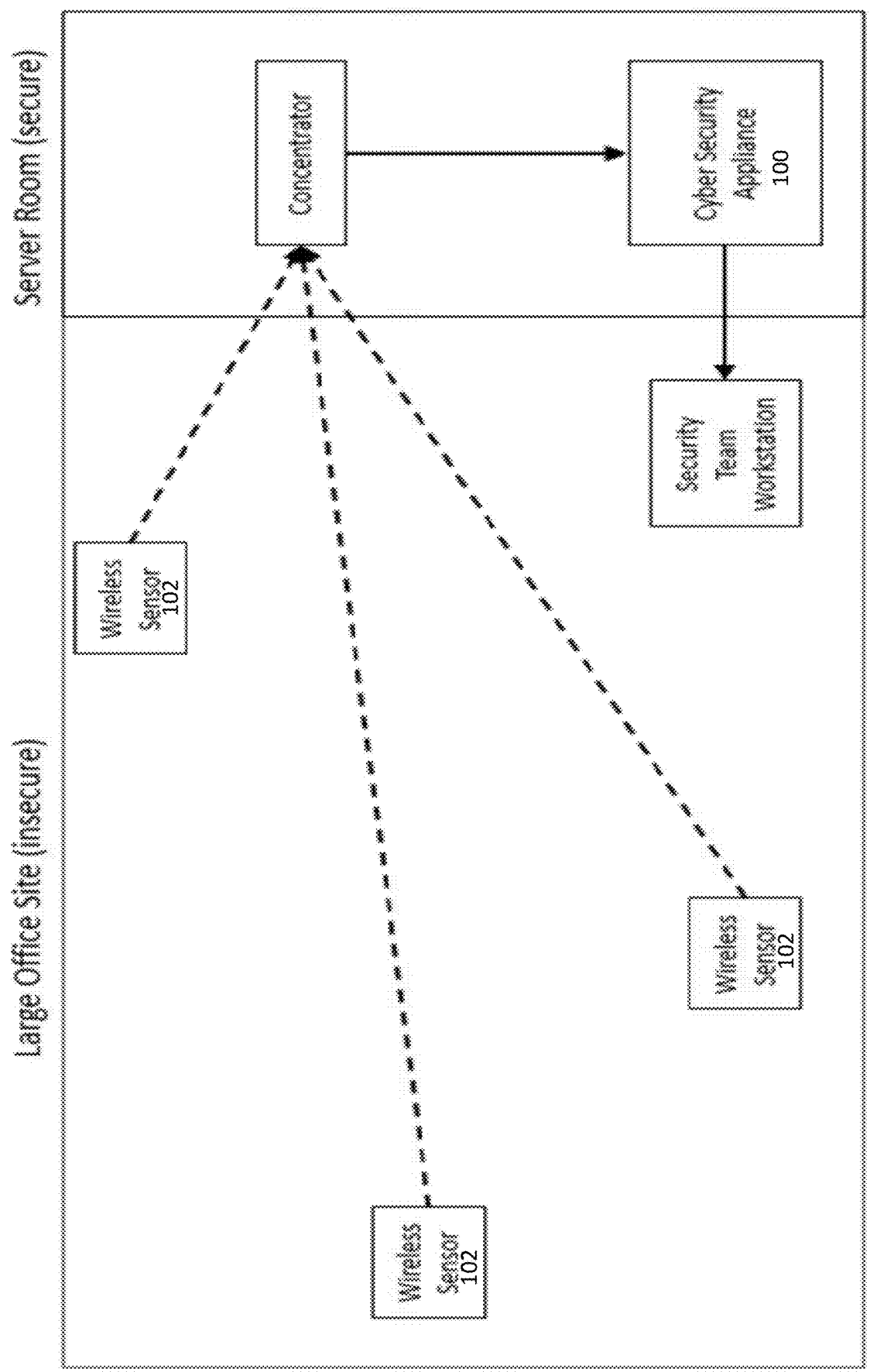
FIG. 4 illustrates an embodiment of a block diagram of an example physical arrangement of deployment of components in the Artificial Intelligence based cyber security system and direction of information transfer.

FIG. 4 illustrates an embodiment of a block diagram of an example physical arrangement of deployment of components in the Artificial Intelligence based cyber security system and direction of information transfer. The real estate may be a large office site insecure and exposed to WiFi networks not owned by the organization and/or having areas readily accessible by the public. The cyber security system will geographically spread out over real estate maintained by the organization. The cyber security system can include a cyber security appliance 100 and a wireless concentrator located in a secure server room, and multiple wireless sensors 102 located around the airspace monitored by the organization.

Cyber security coverage on the wireless activity is typically a weak part of a businesses' digital estate. A lot of organizations need to live with an unwanted mixing of corporate and non-corporate devices and (corporate and non-corporate) wireless networks, all existing within the wireless transmission capabilities of that airspace used by the real estate maintained by the organization.

Each wireless sensor's 102 communication module can transmit data back to the wireless concentrator through a wired connection for security reasons but could also use a secure WiFi channel as well. The wireless concentrator can be desirable from a network security perspective rather than technically necessary. Note, it is also not necessary for more than one wireless sensor 102 to have coverage of each wireless transmission in order to give a general geographic area where a wireless transmission occurs. It may be advantageous to position most wireless sensors 102 next to the corporate wireless access points, as these are typically the most interesting locations for wireless transmissions to arrive.

A wireless module (e.g., 1st domain module in FIG. 9) merely needs one of these wireless sensors 102 to see any particular wireless transmission in order to determine a general geographical area of its transmission source which is very different to the existing technologies on the market that need to have multiple probes/recipients to see the same wireless anomaly in order to triangulate and calculate a location.

Thus, the cyber threat analyst module in the cyber security appliance 100 can cooperate with one or more AI models trained on how human cyber security analysts conduct cyber investigations to conduct initial investigations regarding at least the anomaly of interest, and then to collect additional information in several rounds of making logical nexuses over time (see FIG. 10 where the investigation looks at anomalies over a 7 day period) to form a chain of potentially related information under analysis from either prior wireless transmissions and/or activity from the second domain that have a probability above a threshold of a logical nexus to the anomaly of interest and/or wireless transmission itself. The cyber threat analyst module can cooperate with 1) the one or more AI models trained on how human analysts conduct cyber investigations to form one or more hypotheses, 2) one or more scripts outlining how to conduct an investigation on a possible set of cyber threats hypotheses, 3) one or more rules based models on an investigation on a possible set of cyber threats hypotheses how to conduct an investigation on a possible set of cyber threats hypotheses, and 4) any combination of these on potential cyber threats that could have this chain of potentially related information that includes the anomaly of interest under analysis. The cyber threat analyst module will perform the several additional rounds of gathering additional information in order to refute or to support each of the one or more hypotheses to re-check cyber threat indications for the chain of potentially related information under analysis until the one or more hypotheses on potential cyber threats are one of refuted, supported, or included in the report that includes details of activities assessed to be relevant activities to the anomaly of interest to the user, and that also conveys at least a first hypothesis is neither supported or refuted; and thus, needs a human to further investigate the anomaly of interest.

The cyber security system can use a lower density of wireless sensors 102 in the real estate to effectively locate anomaly of interest that is a suspicious wireless transmission in the airspace as opposed to a required triangulation by three or more wireless sensors 102 to determine the location of the wireless transmission source. The AI cyber security system monitors wireless data transmissions with one or more wireless sensors 102 to be able to detect regular and suspicious wireless transmissions. Thus, the AI cyber security system can achieve complete airspace coverage in the real estate housing the AI cyber security system with merely, for example, three, four, or five wireless sensors 102. The wireless sensors 102 themselves will be estimating the direction and distance of the suspicious transmission, which can be aided by the wireless concentrator when two or more of the wireless sensors 102 detect the suspicious wireless transmission. From that point, the hand held portable hunter device 104 then can locate the source of the suspicious (e.g., unknown) transmission. For example, the hand held portable hunter device 104 can be used to locate a tiny IoT device or smart phone that is doing the unauthorized wireless transmissions in a large area. The large area is actually 3 dimensional when one must look from the floor to the ceiling and within all of the cabinets, vents, desks, printers, etc. in that area, which would be nearly impossible without the use of the hand held portable hunter device 104.

As discussed before, the wireless sensors 102 are monitoring airspace communications. Thus, the system can detect when wireless devices that are properly part of this system's wireless network, but connect to someone else's wireless network located in a geographic area overlapping your wireless network real estate. The wireless sensor can perform a deep packet inspection and pass the wireless network's information to the modules of the cyber security appliance 100. In mixed wireless environments, so many possible wireless networks pop up on the display of a user's device. An example wireless device from this system's wireless network might connect to someone else's wireless network located in a geographic area overlapping your wireless network real estate.

On wireless devices capable of running third-party applications (e.g. most laptop computers), endpoint agent software can optionally be installed on each wireless device and used to provide some data about the wireless activity of the device. The endpoint agent software installed on the wireless device can establish communications with the cyber security appliance. The data about the wireless activity of the device might include for example the details of any connected WiFi network through an installed WiFi adapter or details of a WAN connection through an installed mobile/telephone network adapter. Some of these details could be used to correlate wireless signals seen in airspace with other information about the same device, by confirming/matching the identity.

Autonomous actions may be utilized with these endpoint agent software. The installed endpoint agent software can be capable of taking autonomous actions. When the monitored airspace signals can be correlated to a specific endpoint agent's host device, the agent software on that host device could be used to take autonomous actions in response to suspicious activity seen in airspace. These responses might include disconnecting from a specific WiFi network or disabling a specific wireless network adapter. Also, an autonomous action could shut down the connection on the user's device and indicate that unknown wireless network is not an authorized wireless network to connect to. Likewise, the set of wireless sensors 102 are arranged to intercept any kind of WiFi traffic in the airspace which could be, for example, someone had set up a hotspot on their personal smart phone and other devices are connected to that hotspot or someone has created like a shadow office WiFi that employees are connected to. Thus, the set of wireless sensors 102 are arranged to monitor both WiFi networks that exists within the physical space that this organization considers to be under your control as well as WiFi networks that exist the within physical space that the organization is otherwise completely unaware of. As discussed, an example smart phone can act as a local hot spot and be hidden inside a printer or other piece of office equipment. Another example, wireless transmitter can be a rogue IoT device literally in a plug socket, on the floor, or underneath the cover of the multiple plug electrical socket.

Figure 5B:
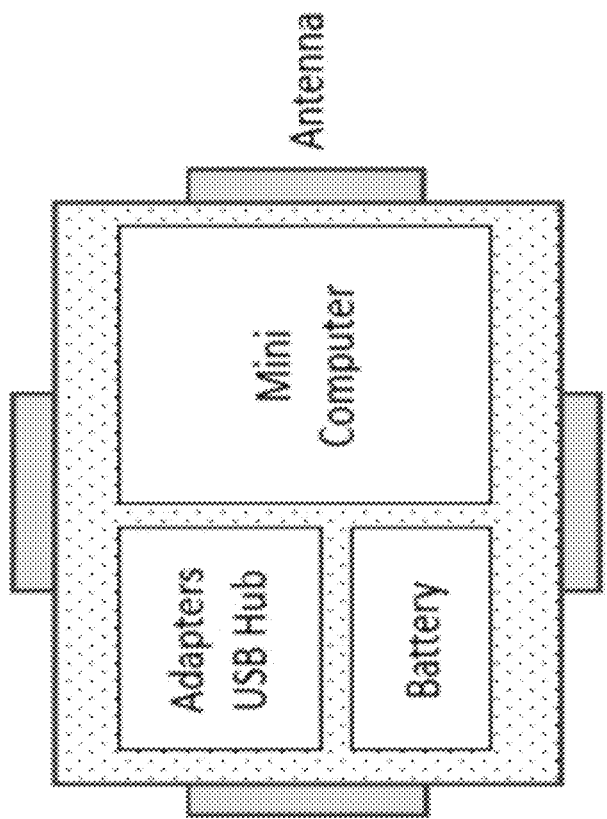
FIG. 5B illustrates an embodiment of a block diagram of an example hardware layout for a portable hunter device beneath the display screen and cover.
Figure 5A:
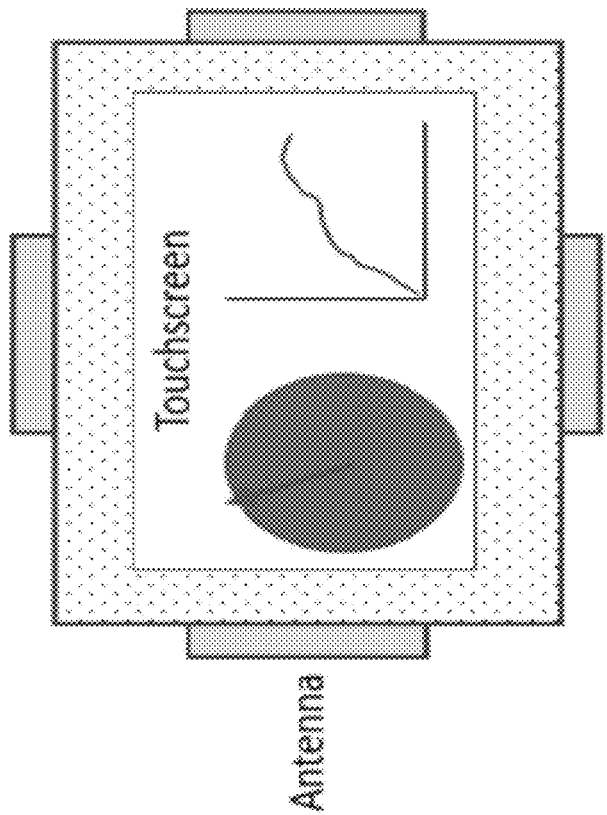
FIG. 5A illustrates an embodiment of a block diagram of an example hardware layout for a portable hunter device having one or more wireless receivers to determine a physical location of the wireless transmission source.

FIG. 5A illustrates an embodiment of a block diagram of an example hardware layout for a portable hunter device 104 having one or more wireless receivers to determine a physical location of the wireless transmission source.

FIG. 5B illustrates an embodiment of a block diagram of an example hardware layout for a portable hunter device 104 beneath the display screen and cover. The portable hunter device 104 can have one or more wireless receivers including bandpass filters, one or more antennas including a directional antenna, one or more Radio Frequency protocol adapters, a USB Hub, a touchscreen, a mini computer including one or more algorithms, a memory, and one or more processors, a battery, a directional indicator to a transmission source, as well as a signal strength of the suspicious wireless transmission that is the anomaly of interest from the wireless transmission source.

The portable hunter device 104 can have multiple Radio Frequency protocol adapters and multiple antennae to detect and identify:
  monitor multiple different wireless transmission types, frequencies and protocols,
  estimate the direction of incidence of the transmission on the wireless transmitter device,
  a gyroscopic sensor can also be added to account for the rotation of the portable hunter device 104 on the display screen so that as the hunter's display screen spins, then the portable hunter device 104 continues to point in the same direction.

Once a suspicious transmission is identified, a Portable hunter device 104 allows an operator to track down the wireless transmission source. This solution uses one or more portable receivers that factor in signal strength of the suspicious transmission in determining an exact physical location of the wireless transmitter device. The portable hunter device 104 can factor in at least one of i) an increase of signal strength of the suspicious wireless transmission, ii) a decrease of signal strength of the suspicious wireless transmission that is the anomaly of interest from the wireless transmission source, and iii) any combination of both in determining a physical location of the wireless transmission source. The touchscreen might show, for example, a signal strength history graph, and a compass that points in the direction of where the portable hunter device 104 thinks the suspicious transmission signal is coming from, another visual indication such as LEDs lighting up to indicate a current direction to the transmission source. The touchscreen, lights/LEDs, or other directional indicator can show a direction to the wireless transmission source as well as a signal strength of its wireless transmissions. The portable hunter device 104 has one or more wireless receivers configured to allow an operator to physically move with the portable hunter device 104 to determine a physical location of the wireless transmission source versus a general geographical area the wireless transmission source could be in.

Note, the anomaly of interest can be a suspicious wireless transmission in the airspace detected by the wireless sensor 102 from at least one of 1) transmitted from a wireless transmitter device, which was not known previously to the Artificial Intelligence models trained to model a normal pattern of life for entities in the wireless domain, and 2) transmitted from a known wireless transmitter device, which is known previously to the Artificial Intelligence models trained to model the normal pattern of life for entities in the wireless domain but is interacting with a wireless network that is not normally part of the wireless domain being protected by the cyber security system (e.g. a corporate wireless device that normally communicates with the corporate wireless network starting to interact with a non-corporate network), 3) transmitted in a frequency range not within a frequency range associated with one or more of the Radio Frequency protocol standards, (such as WiFi, ZigBee, 5G, etc.), known by the Artificial Intelligence models trained to model the normal pattern of life for entities in the wireless domain (e.g. transmitted in a radio frequency range that is not within any frequency range used by the many different Radio Frequency protocol standards); and 4) transmitted in the frequency range from the wireless transmitter device within a frequency range associated with the Radio Frequency protocol standard, (such as 2.4 GHz for WiFi), known by the Artificial Intelligence models trained to model a normal pattern of life for entities in the wireless domain but not formatted in the Radio Frequency protocol standard (e.g., not formatted in the WiFi protocol) associated with that transmitted frequency range, and 5) any combination of these.

The USB hub can allow both a way to communicate with the portable hunter device 104 and a way to charge a battery of the portable hunter device 104. Alternatively, the portable hunter device 104 may have a separate power connector.

Figure 6:
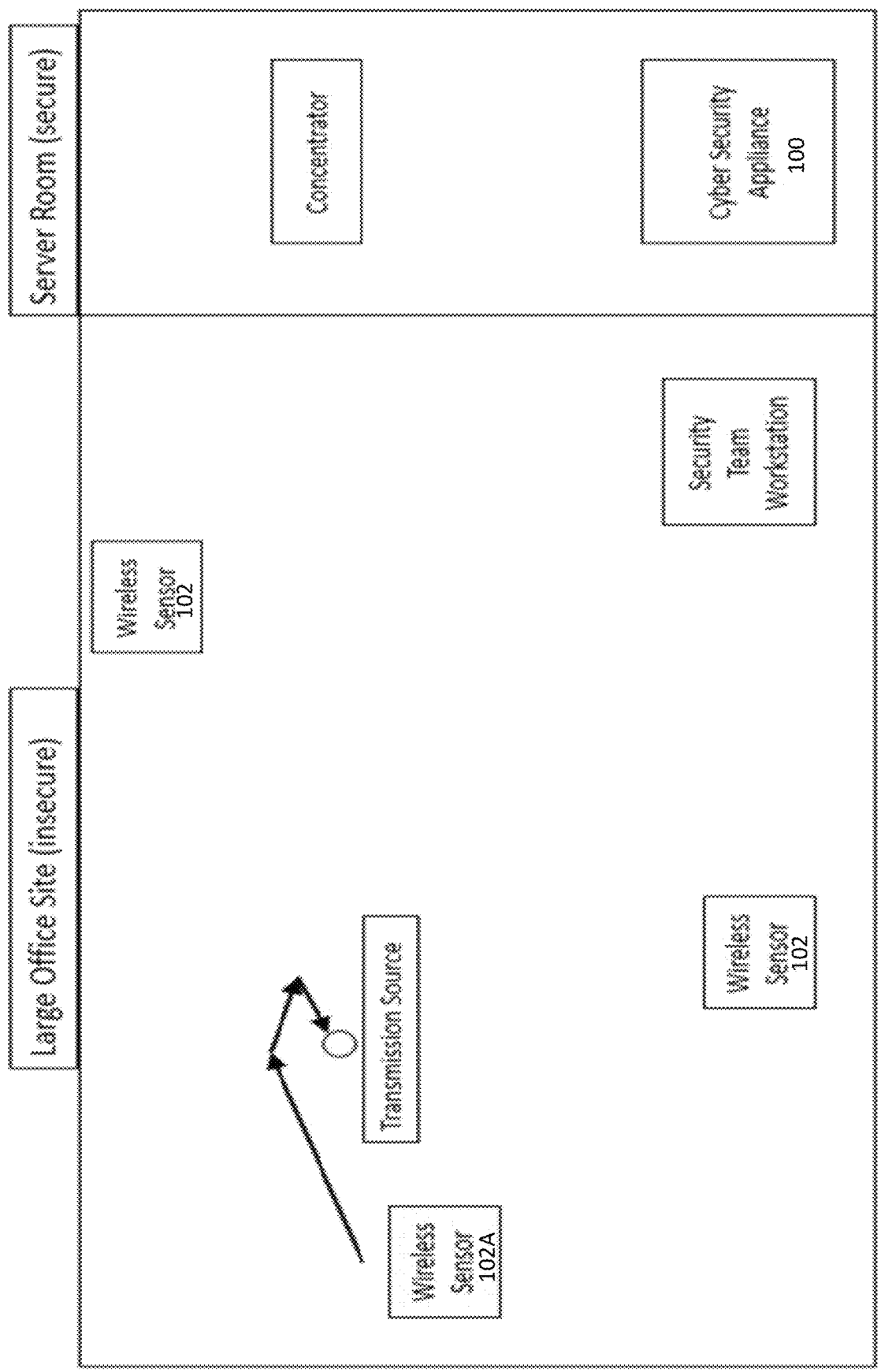
FIG. 6 illustrates an embodiment of a block diagram of an example use of a portable hunter device to track down the source of a suspicious wireless transmission.

FIG. 6 illustrates an embodiment of a block diagram of an example use of a portable hunter device to track down the source of a suspicious wireless transmission.

The portable hunter device has one or more wireless receivers to cooperate with the one or more wireless sensors 102 to find a physical location of the wireless transmitter device. The portable hunter device can use 1) a location of a wireless sensor 102 closest/nearest to the suspicious wireless transmission (e.g., the anomaly of interest) in the airspace and 2) identifying details of the suspicious wireless transmission in the airspace in order to indicate a general geographical area of where the suspicious wireless transmission source could be in order to assist the portable hunter device in finding an exact physical location of the wireless transmitter device. In this example, the third wireless sensor 102A is the closest to the suspicious wireless transmission and its wireless transmission source. The wireless sensor 102 measuring the highest signal strength of the suspicious wireless transmission is the third wireless sensor 102. The operator with the portable hunter device starts from the closest wireless sensor 102 and follows the indicator on the portable hunter device around until it gradually narrows down on the wireless transmission source.

The signal strength (and possibly estimated direction) indicated on the portable hunter device allows the wireless transmission source to be approached. Note, any individual reading may not be an accurate indicator of which way to go, but overall trends are.

The multiple wireless sensors 102 can indicate the closest wireless sensor 102 to the suspicious wireless transmission, but an exact location is then based ultimately on the signal strength ratings and estimated direction of the source.

Unlike existing systems which may use a network of overlapping nodes to detect the location of all devices, the cyber security system merely requires a single wireless sensor 102 to observe an anomaly to obtain a general area in order for the hand held portable hunter device to track down a wireless device causing the anomaly.

Figure 7:
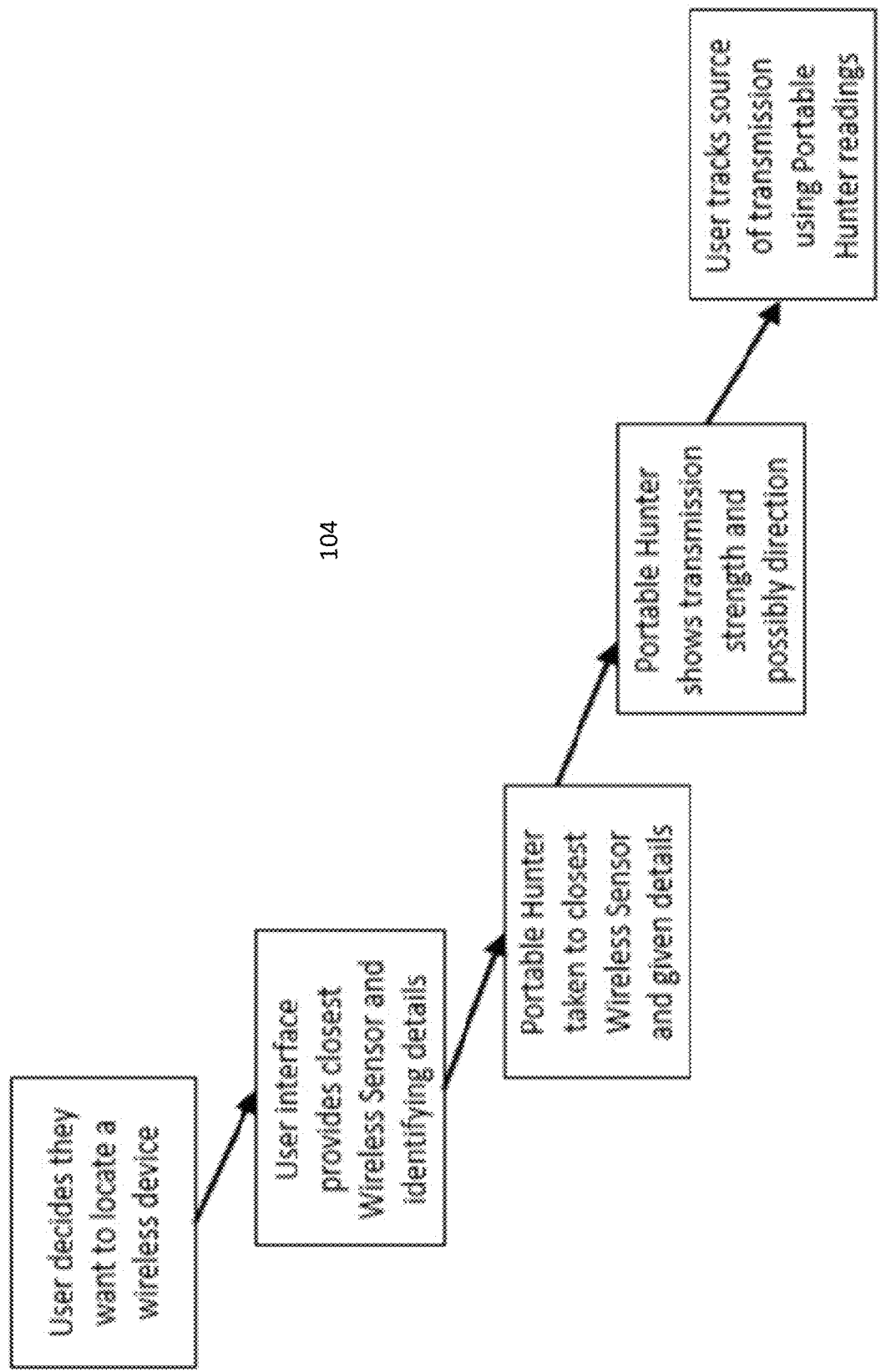
FIG. 7 illustrates an embodiment of a block diagram of an example flow chart of locating an anomaly of interest from a wireless transmitter device.

FIG. 7 illustrates an embodiment of a block diagram of an example flow chart of locating an anomaly of interest from a wireless transmitter device.

A user interface of a device associated with the user and/or user interface of the cyber security appliance 100 posts an alert or report that prompts a portable hunter device 104 to cooperate with the one or more wireless sensors 102 to find a physical location of the wireless transmitter device. Typically, the alert or the incident report can include information such as the wireless transmitter device is completely unidentified but an active wireless transmission on an interesting wireless network and/or an area to investigate based on its nearest wireless sensor. Also, the user interface can provide a closest wireless sensor 102 and other identifying details of the suspicious wireless transmission. The user interface can provide a closest wireless sensor 102 based on signal strength power readings taken from one or more wireless sensors 102 at approximately the same time (e.g., within a 2 seconds of each other). The identifying details of the suspicious wireless transmission might be a MAC address (e.g., for WiFi) or frequency band (e.g., for an unknown radio transmission) and protocol being used if that can be detected, and its approximate signal strength. The communication module of the cyber security appliance 100 can send those identifying details to the portable hunter device 104 (e.g., a MAC address or frequency band of the unknown transmission) and the closest wireless sensor 102 that is the most suitable starting location for a physical search. The communication module of the cyber security appliance 100 may automatically send the information to the portable hunter device 104 and/or these details can be manually transferred. Note, the more wireless sensors 102 detecting the suspicious wireless transmission and its relative signal strength measured by each wireless sensor 102 can improve this starting point and likely physical location of the wireless transmission source. The user interface of the portable hunter device 104 can display the closest wireless sensor 102 and given details. The portable hunter device 104 uses its directional indicator to a transmission source as well as a signal strength of the wireless transmission that is the anomaly of interest from the wireless transmission source to allow an operator to physically move with the portable hunter device 104 to determine a physical location of the wireless transmission source.

The portable hunter device 104 can use multiple directional antennae to give the direction of signal arrival. Note, wireless signals can be bounced around making this often inaccurate if the fixed wireless sensors 102 tried alone to determine the location by themselves and/or if the user was not able to physically maneuver the portable hunter device 104 in various angles and directions and/or look at a history of signal strength readings to assist in tracking down the wireless transmission source. The portability of the portable hunter device 104 allows the wireless transmission source to be gradually approached, and this benefits greatly from some indication of signal direction rather than just pure signal strength measurements without additional information.

FIG. 8 illustrates an embodiment of a table of an example of different wireless transmissions that can be monitored by the two or more Radio Frequency protocol adapters cooperating with the wireless receivers bandpass filters and antennas.

The table displays example Radio Frequency protocols and the corresponding frequency ranges associated with that Radio Frequency protocol standard, which would be known and trained on by the Artificial Intelligence models. The table also shows example monitoring methods utilized by an example Radio Frequency protocol adapter.

For example, the Radio Frequency protocol transmission type detected in wireless sensor 102 may be a WiFi protocol transmitted at 2.4 GHz and 5 GHz frequency channels, which could be identified via a WiFi Radio Frequency protocol adapter in Monitor mode. The Radio Frequency protocol transmission type may be ZigBee and other mesh network protocols transmitted on a 2.4 GHz channel, a 900 MHz channel, and/or an 868 MHz channel, which could be identified via a ZigBee Radio Frequency protocol adapter in Monitor mode. The Radio Frequency protocol transmission type may be a 4G protocol transmitted on a 600 MHz channel, a 700 MHz channel, a 1.7 GHz channel, a 2.1 GHz channel, a 2.3 GHz channel, and/or a 2.5 GHz channel, which could be identified via a software defined Radio Frequency protocol adapter coded for each variant and channel. The Radio Frequency protocol transmission type may be a 5G protocol in a first frequency range from 450 MHz to 6 GHz (which includes the LTE frequency range) and/or a second frequency range from 24.25 GHz to 52.6 GHz, which could be identified via a software defined Radio Frequency protocol adapter coded for each variant and channel. The Radio Frequency protocol transmission type may be a suspicious wireless transmission in the airspace from the wireless transmitter device not within frequency ranges associated with Wi-Fi protocol standards known by the Artificial Intelligence models trained to understand and assess the wireless activity from the wireless sensors 102.

Each different Radio Frequency protocol adapter can be configured both to understand one or more particular Radio Frequency protocols and have one or more bandpass, wideband, etc. frequency filters, each set for a particular Radio Frequency protocol.

In general, the AI-based cyber security appliance 100 sees something abnormal or suspicious, then the cyber threat analyst module and/or the analyser module can work with additional mechanisms to form one or more hypotheses on what are the possibilities to cause this abnormal behavior or suspicious activity, then the cyber threat analyst module and/or the analyser module finds evidence/collects additional data to support or refute each possible hypothesis, and then the formatting module generates a formal report.

Figure 9:
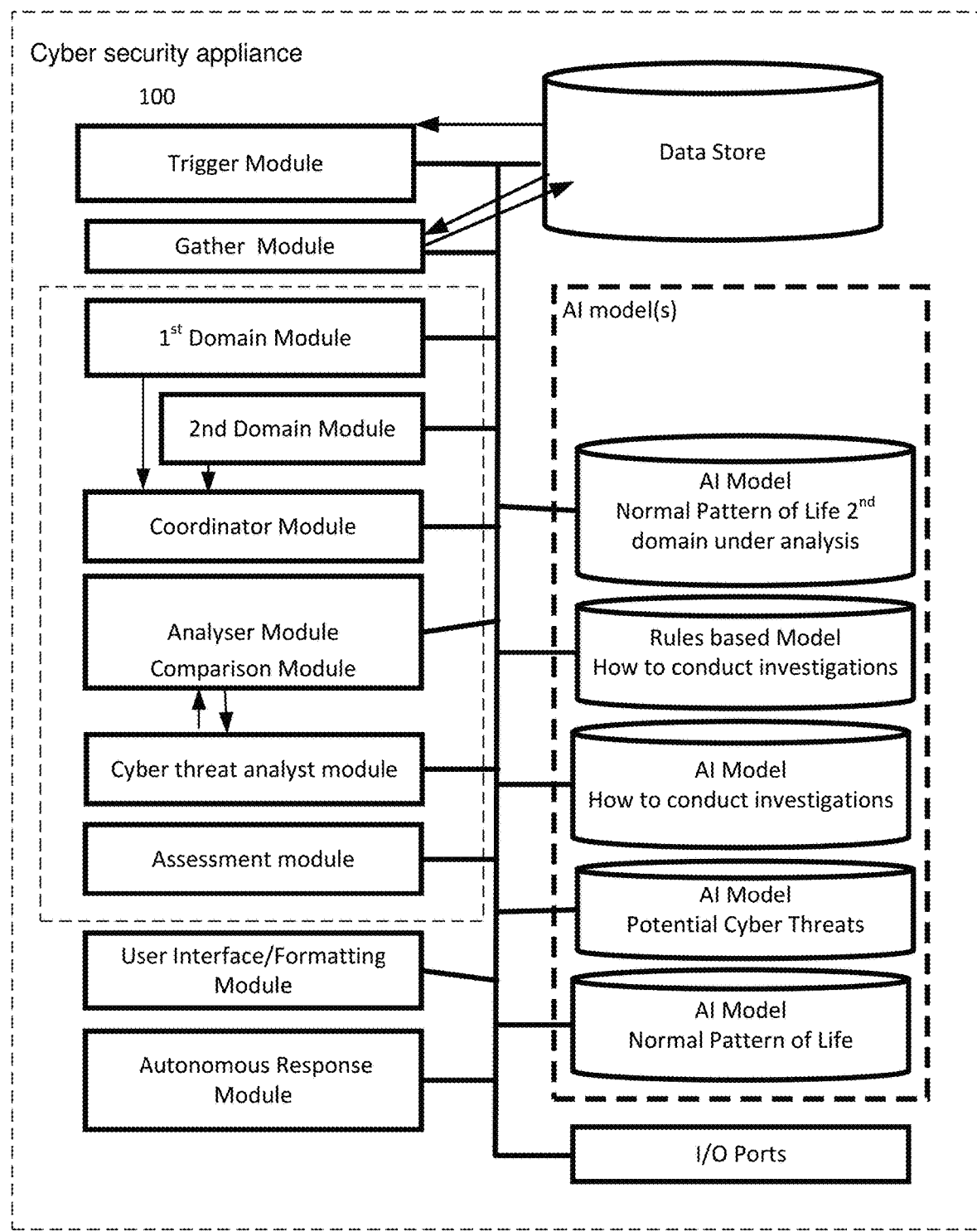
FIG. 9 illustrates a block diagram of an embodiment of the Artificial Intelligence based cyber security appliance to protect a system, including but not limited to a network, from cyber threats.

FIG. 9 illustrates a block diagram of an embodiment of the AI based cyber security appliance that protects a system, including but not limited to a network/domain, from cyber threats. Various Artificial Intelligence models and modules of the cyber security appliance 100 cooperate to protect one or more networks/domains under analysis from cyber threats. The AI-based cyber security appliance 100 may include a trigger module, a gatherer module, an analyser module, a cyber threat analyst module, an assessment module, a formatting module, one or more AI models trained with machine learning on a normal pattern of life for entities in the network/domain under analysis, one or more AI models trained with machine learning on cyber threat hypotheses to form and investigate a cyber threat hypothesis on what are a possible set of cyber threats and their characteristics, symptoms, remediations, etc., and one or more AI models trained on possible cyber threats, a data store, an autonomous response module, a 1st domain module, a 2nd domain module, and a coordinator module.

The cyber security appliance 100 with the Artificial Intelligence (AI) based cyber security system may protect a network/domain from a cyber threat. In an embodiment, the cyber security appliance 100 can protect all of the devices on the network(s)/domain(s) being monitored by monitoring domain activity, for example, network traffic going to and from the devices on the network. The steps below will detail the activities and functions of several of the components in the cyber security appliance 100.

A data gather module may have a series of one or more process identifier classifiers. A process identifier classifier can identify and track each process and device in the network, under analysis, making communication connections. Note, processes may not be present in a first wireless domain being monitored but can be present in the second domain also being monitored. A data store cooperates with the process identifier classifier to collect and maintain historical data of processes and their connections, which is updated over time as the network is in operation. In an example, the process identifier classifier can identify each process running on a given device along with its endpoint connections, which are stored in the data store.

An analyser module can cooperate with other modules and AI models in the cyber security appliance to confirm a presence of a cyber threat attacking one or more domains in an organization's system. A cyber threat analyst module can cooperate with the same other modules and AI models in the cyber security appliance to conduct a long term investigation and/or a more in-depth investigation on potential cyber threats attacking one or more domains in an organization's system. A process identifier in the analyser module can cooperate with the data gatherer module to collect any additional data and metrics to support a possible cyber threat hypothesis. The analyser module and/or the cyber threat analyst module can also look for other anomalies, such as model breaches, including, for example, deviations for a normal behavior of an entity, and other techniques discussed herein. The analyser module and/or the cyber threat analyst module can cooperate with the AI models trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

The cyber threat analyst module in essence allows two levels of investigations of potential cyber threat attacks. In a first level, the analyser module and AI models can rapidly detect and then autonomously respond to overt and obvious cyber threat attacks. However, thousands to millions of low level anomalies occur in a domain under analysis all of the time; and thus, most other systems need to set the threshold of trying to detect a cyber threat attack at level higher than the low level anomalies examined by the cyber threat analyst module just to not have too many false positive indications of a cyber threat attack when one is not actually occurring, as well as to not overwhelm a human cyber analyst receiving the alerts with so many notifications of low level anomalies that they just start tuning out those alerts. However, advanced persistent threats attempt to avoid detection by making these low level anomalies in the system over time during their attack before making their final coup de grace/ultimate mortal blow against the domain being protected. The cyber threat analyst module conducts investigations over time that can detect these advanced persistent cyber threats actively trying to avoid detection by looking at one or more of these low level anomalies as a part of a chain of linked information.

The cyber threat analyst module forms and investigates hypotheses on what are a possible set of cyber threats and can also cooperate with the analyser module with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the one or more AI models trained with machine learning on the normal pattern of life of entities in the system. (For example, see FIG. 10, the cyber threat analyst module will perform several additional rounds of gathering additional information over period of time, in this example, examining data over a 7 day period to determine causal links between the information.) The cyber threat analyst module will submit to check and recheck various combinations/a chain of potentially related information under analysis until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted; and thus, needs a human to further investigate the anomaly of interest included in the chain of potentially related information. Note, a data analysis process can be algorithms/scripts written by humans to perform their function discussed herein; and, can in various cases use AI classifiers as part of their operation. Note, any portions of the AI based cyber security appliance 100 implemented as software can be stored in one or more non-transitory memory storage devices in an executable format to be executed by one or more processors.

Again, an input from the cyber threat analyst module of a supported hypothesis of a potential cyber threat will trigger the analyser module to compare, confirm, and act on that cyber threat. In contrast, the cyber threat analyst module investigates subtle indicators and/or initially seemingly isolated unusual or suspicious activity such as a worker is logging in after their normal working hours or a simple system misconfiguration has occurred. Most of the investigations conducted by the cyber threat analyst module on unusual or suspicious activities/behavior may not result in a cyber threat hypothesis that is supported but rather most are refuted or simply not supported. Typically during the investigations, several rounds of data gathering to support or refute the long list of potential cyber threat hypotheses formed by the cyber threat analyst module will occur before the algorithms in the cyber threat analyst module will determine whether a particular cyber threat hypothesis is supported, refuted, or needs further investigation by a human. The rounds of data gathering will build chains of linked low level indicators of unusual activity along with potential activities that could be within a normal pattern life for that entity to evaluate the whole chain of activities to support or refute each potential cyber threat hypothesis formed. (See again, for example, FIG. 10 and a chain of linked low level indicator all under a 50 on a threat indicator score). The investigations by the cyber threat analyst module can happen over a relatively long period of time and be far more in depth than the analyser module which will work with the other modules and AI models to confirm that a cyber threat has in fact been detected.

The data gatherer module may further extract data from the data store at the request of the cyber threat analyst module and/or analyser module on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The data gatherer module cooperates with the cyber threat analyst module and/or analyser module to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

The cyber threat analyst module is configured to form and investigate hypotheses on what are a possible set of cyber threats and can cooperate with the analyser module with the one or more data analysis processes to confirm the results of the investigation on the possible set of cyber threats hypotheses that would include the at least one of i) the abnormal behavior, ii) the suspicious activity, and iii) any combination of both, identified through cooperation with the one or more AI models trained with machine learning on the normal pattern of life of entities in the domains under analysis.

Likewise, the data gatherer module and the analyser module cooperate to supply further data and/or metrics requested by the analyser module when attempting to support or rebut each cyber threat hypothesis. Again, the analyser module can cooperate with the other modules and AI models to rapidly detect and then autonomously respond to overt and obvious cyber threat attacks, (including ones found to be supported by the cyber threat analyst module).

As a starting point, the AI-based cyber security appliance 100 can use the trigger module to identify abnormal behavior and/or suspicious activity against the AI models of normal behavior for the entities in the network/domain under analysis, which is supplied to the analyser module and/or the cyber threat analyst module. The analyser module and/or the cyber threat analyst module may also receive other inputs such as AI model breaches, AI classifier breaches, a trigger to start an investigation from an external source, etc.

Many other model breaches of the AI models trained with machine learning on the normal behavior of the system can send an input into the cyber threat analyst module and/or the trigger module to trigger an investigation to start the formation of one or more hypotheses on what are a possible set of cyber threats that could include the initially identified abnormal identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v) etc.

Note, the cyber threat analyst module in the AI-based cyber security appliance 100 provides an advantage as it reduces the time taken for human led or cybersecurity investigations, provides an alternative to manpower for small organizations and improves detection (and remediation) capabilities within the cyber security platform.

The cyber threat analyst module that forms and investigates hypotheses on what are the possible set of cyber threats can to use hypotheses mechanisms including any of 1) one or more AI models trained on how human cyber security analysts conduct an investigation on a possible set of cyber threats hypotheses that would include at least an anomaly of interest, 2) one or more scripts outlining how to conduct an investigation on a possible set of cyber threats hypotheses that would include at least the anomaly of interest, 3) one or more rules based models on an investigation on a possible set of cyber threats hypotheses how to conduct an investigation on a possible set of cyber threats hypotheses that would include at least the anomaly of interest, and 4) any combination of these. Again the AI models may use supervised machine learning on human-led cyber threat investigations and then steps, data, metrics, and metadata on how to support or to refute a plurality of the possible cyber threat hypotheses, and then the scripts and rules based models will include the steps, data, metrics, and metadata on how to support or to refute the plurality of the possible cyber threat hypotheses.

Training of AI Pre Deployment and then During Deployment

In step 1, an initial training of Artificial Intelligence models trained on cyber threats can occur using unsupervised learning and/or supervised learning on characteristics and attributes of known potential cyber threats including malware, insider threats, and other kinds of cyber threats that can occur within that domain. The AI model learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. The AI models can be trained with machine learning on possible cyber threats such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model can determine whether a potentially unknown threat has been detected via a number of techniques including an overlap of some of the same characteristics and attributes in that category of cyber threats.

Likewise, pre-deployment machine learning training of one or more Artificial Intelligence models trained on a normal behavior of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models can be implemented with various mechanisms such a neural networks, decision trees, etc. and combinations of these. Likewise, one or more supervised machine learning AI models are trained to create possible hypotheses and perform cyber threat investigations on agnostic examples of past historical incidents of detecting a multitude of possible types of cyber threat hypotheses previously analyzed by human cyber threat analysis. More on the training of AI models are trained to create one or more possible hypotheses and perform cyber threat investigations will be discussed later.

As discussed in more detail below, the analyser module can cooperate with the one or more unsupervised machine learning models trained on the normal pattern of life in order to perform anomaly detection against the actual normal pattern of life for that system to determine whether an anomaly (e.g., the identified abnormal behavior and/or suspicious activity) is malicious or benign. In operation of the cyber security appliance 100, the potential cyber threat can be previously unknown but shares enough (or does not share enough) in common with the traits from the AI models trained on cyber threats to now be identified as malicious or benign. Note, if later confirmed as malicious, then the AI models trained with machine learning on possible cyber threats can update their training. Likewise, as the cyber security appliance 100 continues to operate, then the one or more machine learning models trained on a normal pattern of life for each of the entities in the system can be updated and trained with unsupervised machine learning algorithms. The analyser module can use any number of data analysis processes (discussed more in detail below and including the agent analyser data analysis process here) to help obtain system data points so that this data can be fed and compared to the one or more machine learning models trained on a normal pattern of life, as well as the one or more machine learning models trained on potential cyber threats, as well as create and store data points with the connection finger prints.

All of the above AI models can continually learn and train with unsupervised machine learning algorithms on an ongoing basis when deployed in their system that the cyber security appliance 100 is protecting.

Next, as discussed further below, during pre-deployment the analyser module uses data analysis processes and cooperates with AI models trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyser module can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI models trained on a normal behavior of entities in a domain under analysis may perform the threat detection through a probabilistic change in a normal behavior through the application of, for example, an unsupervised Bayesian mathematical model to detect behavioral change in computers and computer networks. The Bayesian probabilistic approach can determine periodicity in multiple time series data and identify changes across single and multiple time series data for the purpose of anomalous behavior detection. In an example of wireless and IT network domains under analysis, wireless and IT network raw sources of data can be examined along with a large number of derived metrics that each produce time series data for the given metric.

A Little More on the Modules' Interactions

The gatherer module cooperates with a data store. The data store stores comprehensive logs for network traffic observed. These logs can be filtered with complex logical queries and each IP packet can be interrogated on a vast number of metrics in the network information stored in the data store. Similarly, wireless communications and data may be collected and stored in the data store. The gatherer module may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gatherer module for each possible hypothesis.

The data store can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The data gather module may have a process identifier classifier. The process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, wireless data from the data store may be collected and compared.

Examples of domains/networks under analysis can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain. A first domain module can be an IT network module configured to receive information from and send information to, in this example, IT network based sensors (i.e., probes, taps, etc.). The first domain module also has algorithms and components configured to understand, in this example, IT network parameters, IT network protocols, IT network activity, and other IT network characteristics of the network under analysis. A second domain module is, in this example, a wireless module. A second domain module can be a wireless network module configured to receive information from and send information to, in this example, wireless sensors 102. The second domain module also has algorithms and components configured to understand, in this example, wireless parameters, wireless protocols and formats, wireless activity, and other wireless characteristics of the network under analysis. A third or more domain module can also collect domain data from even another domain. The coordinator module is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier in the data gather module can cooperate with additional classifiers in each of the domain modules to assist in tracking individual processes and associating them with entities in a domain under analysis as well as individual processes and how they relate to each other.

A feedback loop of cooperation exists between the gatherer module, the analyser module, one or more models trained on different aspects of this process, and the cyber threat analyst module to gather information to determine whether a cyber threat is potentially attacking the networks/domains under analysis.

Determination of Whether Something is Likely Malicious.

In the following examples the analyser module and/or cyber threat analyst module can use multiple factors to the determination of whether a process, event, object, entity, etc. is likely malicious.

In an example, the analyser module and/or cyber threat analyst module can cooperate with the Artificial Intelligence models trained on potential email cyber threats to detect whether the anomalous activity detected, such as suspicious emails, exhibit traits that may suggest a malicious intent, such as phishing links, scam language, sent from suspicious domains, etc. The analyser module and/or cyber threat analyst module can also cooperate with the Artificial Intelligence models trained on potential wireless based cyber threats to detect whether the anomalous activity detected, such as suspicious wireless signals, user activity, etc., may suggest a malicious intent as indicated by the Artificial Intelligence models trained on potential wireless based cyber threats.

In the above example, the analyser module and/or cyber threat analyst module can cooperate with the one or more Artificial Intelligence models trained with machine learning on the normal pattern of life for entities in an wireless domain under analysis to detect, in this example, anomalous wireless signals which are detected as outside of the usual pattern of life for each entity, such as a user, wireless device, etc., of the wireless network/domain. Likewise, the analyser module and/or cyber threat analyst module can cooperate with the one or more Artificial Intelligence models trained with machine learning on the normal pattern of life for entities in a second domain under analysis (in this example, an IT network) to detect, in this example, anomalous network activity by user and/or devices in the network, which is detected as outside of the usual pattern of life for each entity, such as a user or a device, of the second domain's network under analysis.

Thus, the analyser module and/or cyber threat analyst module can be configured with one or more data analysis processes to cooperate with the one or more AI models trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this threat determination process, the analyser module and/or cyber threat analyst module can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more AI models trained with machine learning on the pattern of life of each device and its associated processes in the system. Next, the analyser module and/or cyber threat analyst module can have an external input to ingest threat intelligence from other devices in the network cooperating with the cyber security appliance 100. Next, the analyser module and/or cyber threat analyst module can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analysis module and/or cyber threat analyst module can combine these Indicators of Compromise (e.g. unusual network JA3, unusual device JA3, suspicious wireless signal . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features looked at. A deeper analysis of endpoint data can include things like the domain metadata itself that can reveal peculiarities and as such one or more indicators of potentially a malicious domain, such as its URL, then this could help confirm an analysis to determine that indeed a cyber threat has been detected. The analysis module can also look at factors of how rare the endpoint connection is, how old the endpoint is, where geographically the endpoint is located, how a security certificate associated with a communication is verified only by endpoint or by external $3^{rd}$ party, just to name a few additional factors. The analysis module (and similarly the cyber threat analyst module) can then assign weighting given to these factors in the machine learning that can be supervised based on how strongly that characteristic has been found to match up to actual malicious sites in the training.

In another AI classifier to find potentially malicious indicators, the agent analyser data analysis process in the analyser module and/or cyber threat analyst module may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyser module cyber threat analyst module may use the agent analyser data analysis process that detects a potentially malicious agent previously unknown to the system e.g. a suspicious wireless signal in the wireless domain to start an investigation on one or more possible cyber threat hypotheses. The determination and output of this step is what are possible cyber threats that can include or be indicated by the identified abnormal behavior and/or identified suspicious activity identified by the agent analyser data analysis process.

In an example, the cyber threat analyst module can use the agent analyser data analysis process and the AI models trained on forming and investigating hypotheses on what are a possible set of cyber threats to use the machine learning and/or set scripts to aid in forming one or more hypotheses to support or refute each hypothesis. The cyber threat analyst module can cooperate with the AI models trained on forming and investigating hypotheses to form an initial set of possible hypotheses, which needs to be intelligently filtered down.

The cyber threat analyst module can be configured to use the one or more supervised machine learning models trained on
- agnostic examples of past history of detection of a multitude of possible types of cyber threat hypotheses previously analyzed by human, who was a cyber security professional,
- a behavior and input of how a plurality of human cyber security analysts make a decision and analyze a risk level regarding and a probability of a potential cyber threat,
- steps to take to conduct an investigation start with anomaly via learning how expert humans tackle investigations into specific real and synthesized cyber threats and then the steps taken by the human cyber security professional to narrow down and identify a potential cyber threat, and
- what type of data and metrics that were helpful to further support or refute each of the types of cyber threats, in order to determine a likelihood of whether the abnormal behavior and/or suspicious activity is either i) malicious or ii) benign?

The cyber threat analyst module using AI models, scripts and/or rules based modules is configured to conduct initial investigations regarding the anomaly of interest, collected additional information to form a chain of potentially related/linked information under analysis and then form one or more hypotheses that could have this chain of potentially information related/link under analysis and then gather additional information in order to refute or support each of the one or more hypotheses.

Figure 10:
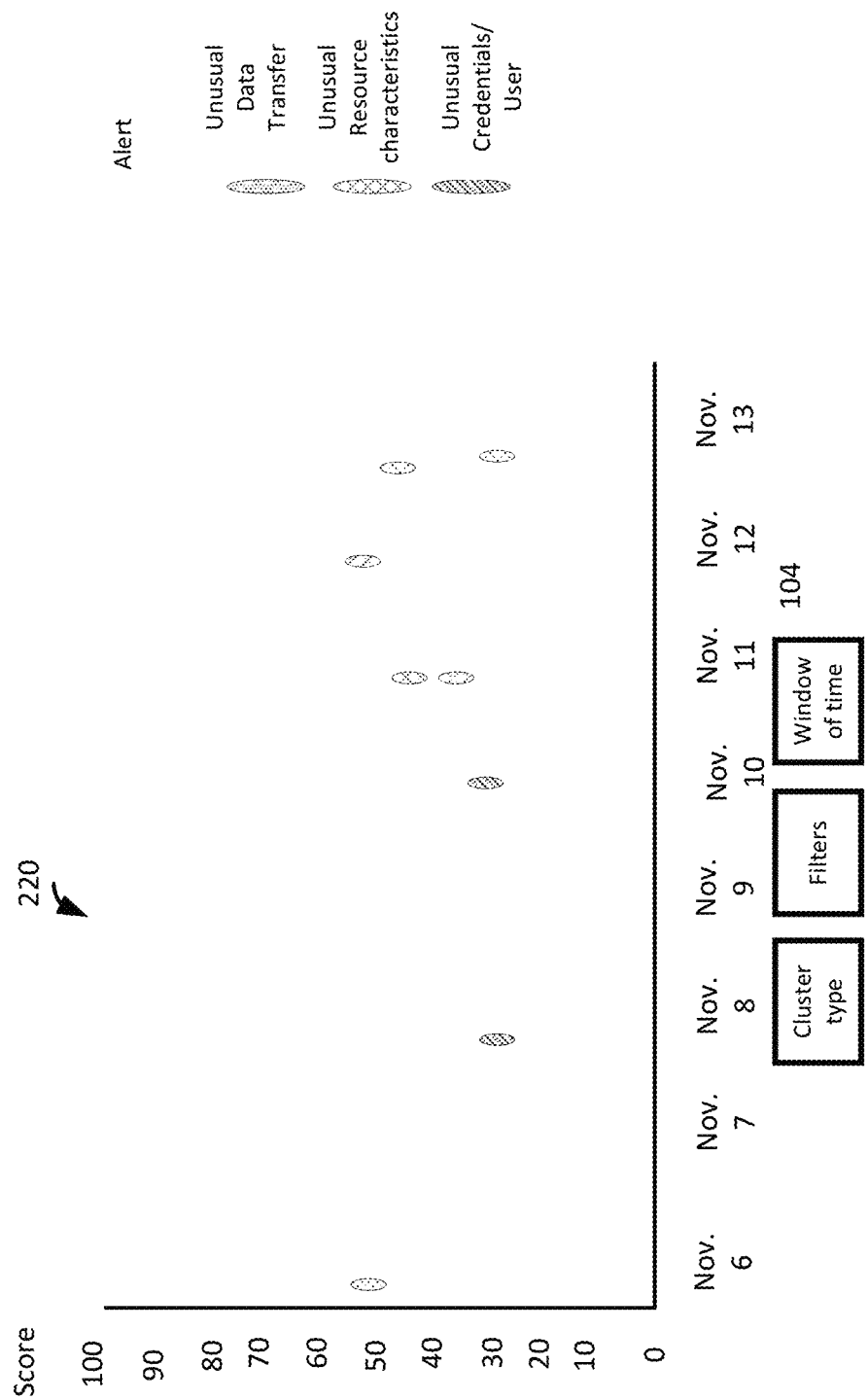
FIG. 10 illustrates a graph of an embodiment of an example chain of unusual behavior for, in this example, the email activities deviating from a normal pattern of life in connection with the rest of the network under analysis.

In an example, a behavioral pattern analysis of what are the unusual behaviors of the network/system/device/user under analysis by the machine learning models may be as follows. The coordinator module can tie the alerts, activities, and events from, in this example, the wireless domain to the alerts, activities, and events from the IT network domain. FIG. 10 illustrates a graph 220 of an embodiment of an example chain of unusual behavior for, in this example, the email activities deviating from a normal pattern of life in connection with the rest of the network under analysis. The cyber threat analysist module and/or analyser module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by initially examining what activities/events/alerts that do not fall within the window of what is the normal pattern of life for that network/system/device/user under analysis, and then the pattern of the behavior of the activities/events/alerts can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor—human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in suspicious wireless signals in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three suspicious wireless signals. Again, the cyber security appliance 100 can go back and pull in some of the normal activities to help support or refute a possible hypothesis of whether that pattern is indicative of a behavior of a malicious actor. The analyser module can cooperate with one or more models trained on cyber threats and their behavior to try to determine if a potential cyber threat is causing these unusual behaviors. The cyber threat analyst module can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

The chain the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order for an Appropriate Autonomous Actions, for Example, Those by the Autonomous Response Module In the next step, the analyser module and/or cyber threat analyst module generates one or more supported possible cyber threat hypotheses from the possible set of cyber threat hypotheses. The analyser module generates the supporting data and details of why each individual hypothesis is supported or not. The analyser module can also generate one or more possible cyber threat hypotheses and the supporting data and details of why they were refuted.

In general, the analyser module cooperates with the following three sources. The analyser module cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The analyser module cooperates with the AI models trained on a normal behavior of entities in the network under analysis. The analyser module cooperates with various AI-trained classifiers. With all of these sources, when they input information that indicates a potential cyber threat that is i) severe enough to cause real harm to the network under analysis and/or ii) a close match to known cyber threats, then the analyser module can make a final determination to confirm that a cyber threat likely exists and send that cyber threat to the assessment module to assess the threat score associated with that cyber threat. Certain model breaches will always trigger a potential cyber threat that the analyser will compare and confirm the cyber threat.

In the next step, an assessment module with the AI classifiers is configured to cooperate with analyser module. The analyser module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order assign a numerical assessment of a given cyber threat hypothesis that was found likely to be supported by the analyser module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyser module, which includes the abnormal behavior or suspicious activity as well as one or more of the collection of system data points, with the one or more AI models trained on possible cyber threats.

The cyber threat analyst module in the AI based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module performs its own computation of threat and identifies interesting network events with one or more processors. These methods of detection and identification of threat all add to the above capabilities that make the AI-based cyber threat analyst module a desirable part of the cyber security appliance 100. The AI-based cyber threat analyst module offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the analyser module. Again as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the analyser module and the assessment module depending on what the user wants to be reported.

The formatting module is configured to format, present a rank for, and output one or more supported possible cyber threat hypotheses from the assessment module into a formalized report, from a one or more report templates populated with the data for that incident.

The formatting module is configured to format, present a rank for, and output one or more detected cyber threats from the analyser module or from the assessment module into a formalized report, from a one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three.

The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat.

The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with knowledge that malicious activity is likely occurring/is associated with a given process from the analyser module, then cooperates with the autonomous response module to take an autonomous action such as i) deny access in or out of the device or the network and/or ii) shutdown activities involving a detected malicious agent.

The trigger module, analyser module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Figure 11:
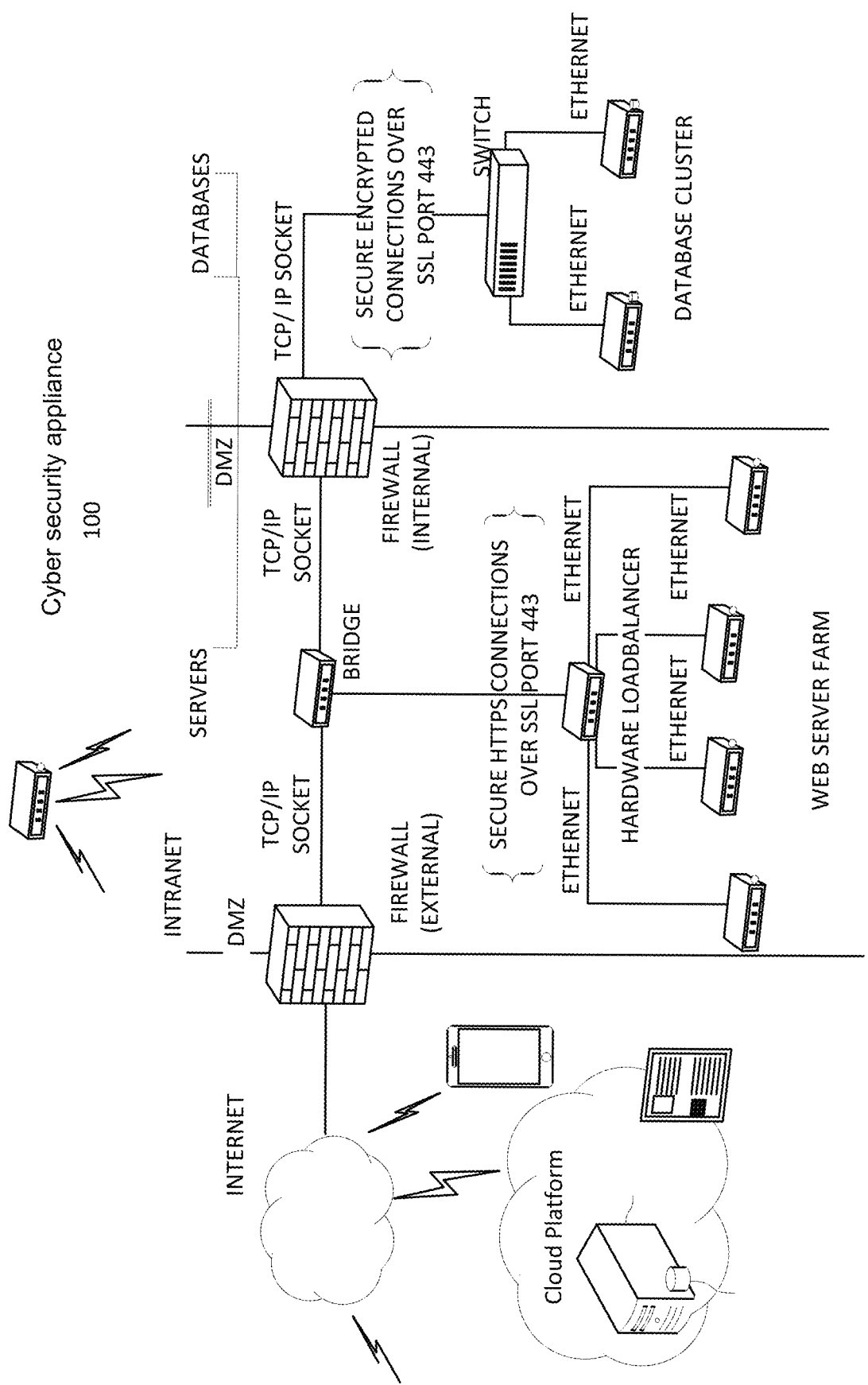
FIG. 11 illustrates a block diagram of an embodiment of the Artificial Intelligence based cyber security appliance plugging in as an appliance platform to protect a system.

FIG. 11 illustrates a block diagram of an embodiment of the AI based cyber security appliance plugging in as an appliance platform to protect a system. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Figure 12:
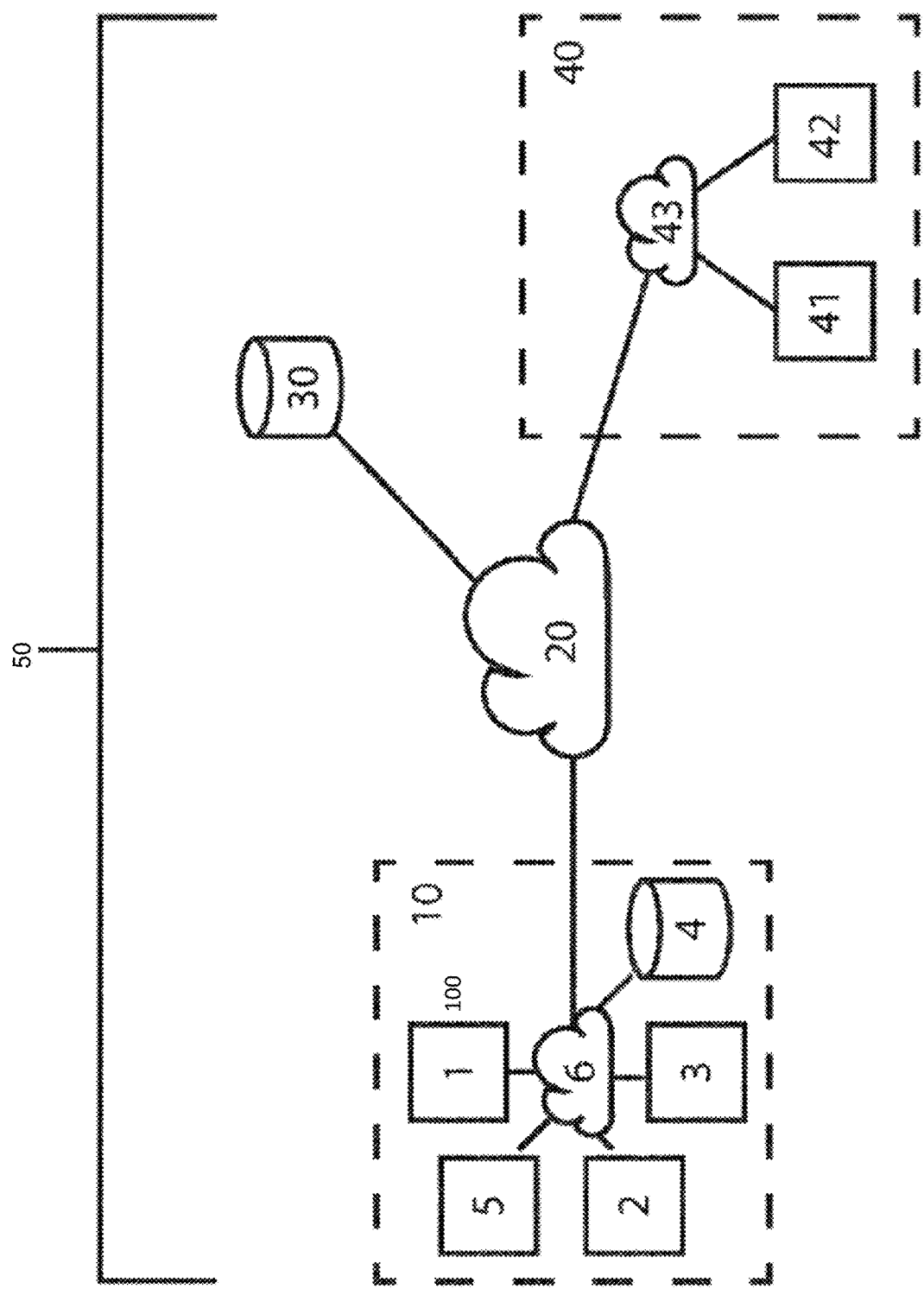
FIG. 12 illustrates an example Artificial Intelligence based cyber security system using an Artificial Intelligence based cyber security system to protect an example network.

FIG. 12 illustrates an example Artificial Intelligence based cyber security system using a cyber threat analyst module 104 to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation.

The cyber security appliance 100 is built to deal with the fact that today's attackers are getting stealthier and an attacker/malicious agent may be 'hiding' in a system to ensure that they avoid raising suspicion in an end user, such as by slowing their machine down.

The cyber security appliance 100 builds a sophisticated 'pattern of life'—that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-RAN or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

Figure 13:
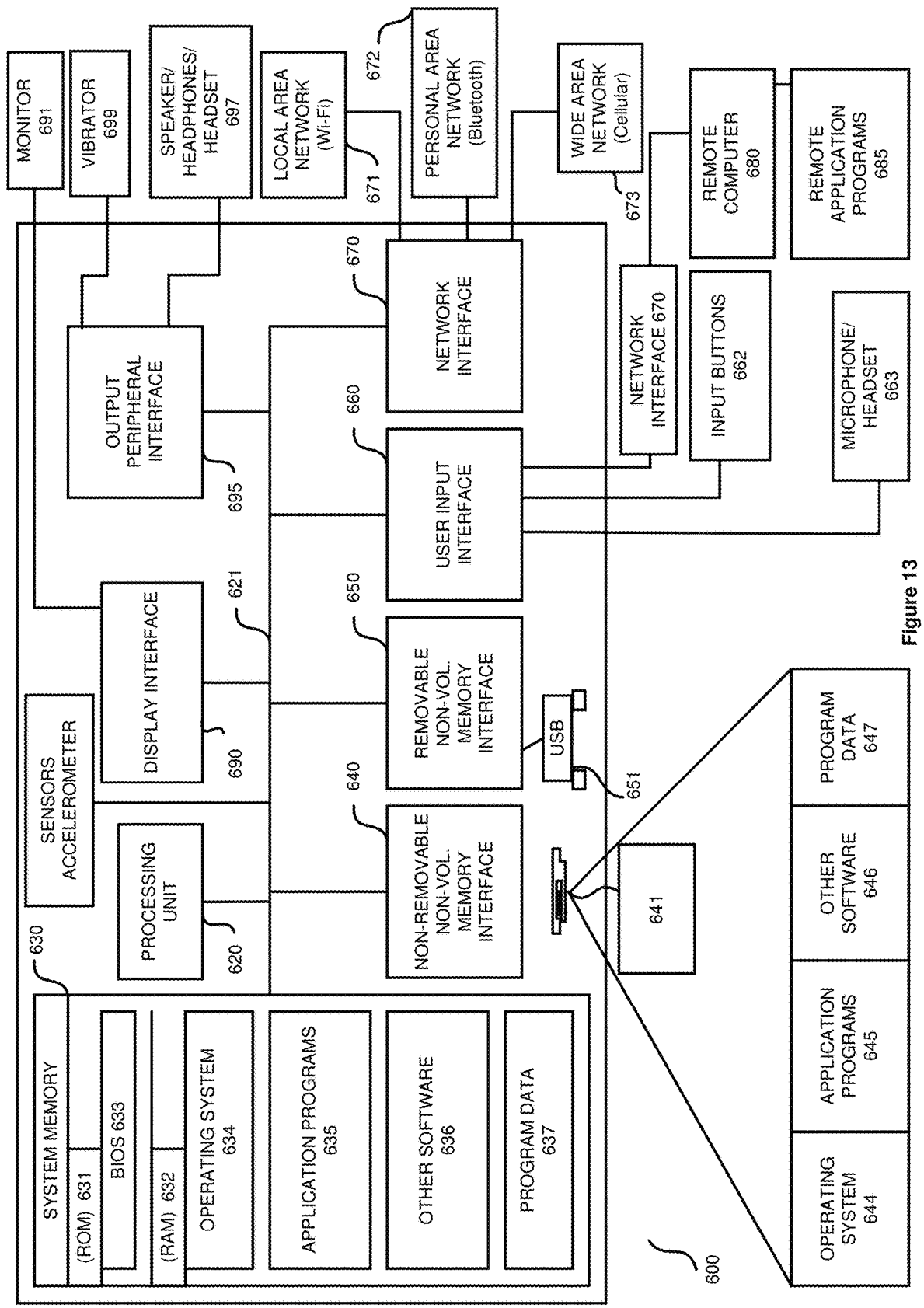
FIG. 13 illustrates a block diagram of an embodiment of one or more computing devices that can be a part of the Artificial Intelligence based cyber security system for an embodiment of the current design discussed herein.

FIG. 13 illustrates a block diagram of an embodiment of one or more computing devices that can be a part of the Artificial Intelligence based cyber security system for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An Artificial Intelligence based cyber security system, comprising:
 a coordinator module, a cyber threat analyst module, and one or more Artificial Intelligence models trained to model a normal pattern of life for entities in a wireless domain and a normal pattern of life for entities in a second domain are configured to cooperate with a combination of 1) wireless sensors with one or more Radio Frequency protocol adapters to monitor and analyze wireless activity, including wireless transmissions transmitted through airspace in the wireless domain, and 2) probes to monitor activity in the second domain, which includes any of i) an Information Technology network, ii) an Operational Technology network, iii) a Cloud service, iv) a SaaS service, v) an endpoint device, and vi) an email domain in order to analyze at least an anomaly of interest in one of 1) the wireless activity from the wireless sensors in view of the activity in the second domain from the probes, 2) the activity from the second domain from the probes in view of the wireless activity in the wireless domain from the wireless sensors, and 3) and any combination of both in order for the coordinator module, the cyber threat analyst module, and the one or more Artificial Intelligence models to cooperate to analyse the anomaly of interest in a wider view of another domain's activity;

where the coordinator module and the cyber threat analyst module are configured to cooperate to understand and assess the wireless activity from the wireless sensors as well as the activity from the second domain from the probes from the second domain in light of the one or more Artificial Intelligence models trained to model a normal pattern of life for entities in a wireless domain and a normal pattern of life for entities in a second domain in order to detect a cyber threat indicated by at least by the anomaly of interest, where the coordinator module and the cyber threat analyst module are implemented in hardware electronic components, software components, and any combination of both;

a formatting model is configured to generate at least one of i) an alert to a user and ii) a report that includes details of activities assessed to be relevant activities to the anomaly of interest to the user when a possibility of the cyber threat is above a threshold based upon input from the cyber threat analyst module, where the formatting model is configured to deliver the alert and/or the report via a medium of at least one of 1) a printable report, 2) presented digitally on a graphical user interface, 3) presented digitally in an email on a display, 4) presented digitally in a message on the display, and 5) in a machine readable format for further reinforcement of machine learning, where the Artificial Intelligence models and the formatting model are implemented in hardware electronic components, software components, and any combination of both;

where the anomaly of interest is a suspicious wireless transmission from a wireless transmission source;

where a portable hunter device is configured to have one or more wireless receivers, one or more antennas, one or more Radio Frequency protocol adapters, a battery, a directional indicator to the wireless transmission source as well as a signal strength of the suspicious wireless transmission that is the anomaly of interest from the wireless transmission source; and where the portable hunter device is configured to factor in at least one of i) an increase of signal strength of the suspicious wireless transmission, ii) a decrease of signal strength of the suspicious wireless transmission that is the anomaly of interest from the wireless transmission source, and iii) any combination of both in determining a physical location of the wireless transmission source.

2. The Artificial Intelligence based cyber security system of claim 1, further comprising:

where the anomaly of interest is a suspicious wireless transmission in the airspace from at least one of 1) transmitted from a wireless transmitter device, which was not known previously to the Artificial Intelligence models trained to model a normal pattern of life for entities in the wireless domain, and 2) transmitted in a frequency range not within frequency ranges associated with WiFi protocol standards known by the Artificial Intelligence models trained to model a normal pattern of life for entities in the wireless domain; and a portable hunter device having one or more wireless receivers configured to allow an operator to physically move with the portable hunter device to determine a physical location of the wireless transmission source.

3. An Artificial Intelligence based cyber security system, comprising:

a coordinator module, a cyber threat analyst module, and one or more Artificial Intelligence models trained to model a normal pattern of life for entities in a wireless domain and a normal pattern of life for entities in a second domain are configured to cooperate with a combination of 1) wireless sensors with one or more Radio Frequency protocol adapters to monitor and analyze wireless activity, including wireless transmissions transmitted through airspace in the wireless domain, and 2) probes to monitor activity in the second domain, which includes any of i) an Information Technology network, ii) an Operational Technology network, iii) a Cloud service, iv) a SaaS service, v) an endpoint device, and vi) an email domain in order to analyze at least an anomaly of interest in one of 1) the wireless activity from the wireless sensors in view of the activity in the second domain from the probes, 2) the activity from the second domain from the probes in view of the wireless activity in the wireless domain from the wireless sensors, and 3) and any combination of both in order for the coordinator module, the cyber threat analyst module, and the one or more Artificial Intelligence models to cooperate to analyse the anomaly of interest in a wider view of another domain's activity;

where the coordinator module and the cyber threat analyst module are configured to cooperate to understand and assess the wireless activity from the wireless sensors as well as the activity from the second domain from the probes from the second domain in light of the one or more Artificial Intelligence models trained to model a normal pattern of life for entities in a wireless domain and a normal pattern of life for entities in a second domain in order to detect a cyber threat indicated by at least by the anomaly of interest, where the coordinator module and the cyber threat analyst module are implemented in hardware electronic components, software components, and any combination of both;

a formatting model is configured to generate at least one of i) an alert to a user and ii) a report that includes details of activities assessed to be relevant activities to the anomaly of interest to the user when a possibility of the cyber threat is above a threshold based upon input from the cyber threat analyst module, where the formatting model is configured to deliver the alert and/or the report via a medium of at least one of 1) a printable report, 2) presented digitally on a graphical user interface, 3) presented digitally in an email on a display, 4) presented digitally in a message on the display, and 5) in a machine readable format for further reinforcement of machine learning, where the Artificial Intelligence models and the formatting model are implemented in hardware electronic components, software components, and any combination of both;

where the anomaly of interest is a suspicious wireless transmission in the airspace from at least one of 1) transmitted from a wireless transmitter device, which was not known previously to the Artificial Intelligence models trained to model a normal pattern of life for entities in the wireless domain, where the Artificial Intelligence models are configured to use at least an unsupervised machine learning algorithm to update a training data for the Artificial Intelligence models trained to model a normal pattern of life in light of the wireless activity supplied by the wireless sensors, and 2) transmitted from a known wireless transmitter device, which is known previously to the Artificial Intelligence models trained to model the normal pattern of life for entities in the wireless domain, but is interacting with a wireless network that is not normally part of the wireless domain being protected by the cyber security system; and where a portable hunter device having one or more wireless receivers is configured to cooperate with the one or more wireless sensors to find a physical location of the wireless transmitter device, where the portable hunter device is configured to use 1) a location of a wireless sensor closest to the suspicious wireless transmission in the airspace that is the anomaly of interest and 2) identifying details of the suspicious wireless transmission in the airspace that is the anomaly of interest in order to indicate a general geographical area of a source of the suspicious wireless could be in order to assist the portable hunter device in finding an exact physical location of the wireless transmitter device.

4. The Artificial Intelligence based cyber security system of claim 1, where the coordinator module, the cyber threat analyst module, the formatting module, and the one or more Artificial Intelligence models trained to model the normal pattern of life for entities in the wireless domain and the normal pattern of life for entities in the second domain are located in a cyber security appliance, where the formatting module is configured to generate the alert to the user on a user interface of the cyber security appliance and/or a device associated with the user whenever the anomaly of interest is a suspicious wireless transmission in the airspace from at least one of 1) transmitted from a wireless transmitter device, which was not known previously to the Artificial Intelligence models trained to model the normal pattern of life for entities in the wireless domain, and 2) transmitted from a known wireless transmitter device, which is known previously to the Artificial Intelligence models trained to model the normal pattern of life for entities in the wireless domain, but is interacting with a wireless network that is not normally part of the wireless domain being protected by the cyber security system; as well as where the coordinator module is configured to determine how links exist between the wireless activities that include alerts, events and the suspicious wireless transmission, from the wireless domain to the activities that include alerts and events from the second domain supplied by the probes.

5. The Artificial Intelligence based cyber security system of claim 1, further comprising:

where the cyber threat analyst module is further configured to cooperate with one or more AI models trained on how human cyber security analysts conduct cyber investigations to conduct initial investigations regarding at least the anomaly of interest, and then to collect additional information to form a chain of potentially related information under analysis from either prior wireless transmissions and/or activity from the second domain that have a probability above a threshold of a logical nexus to the anomaly of interest, where the cyber threat analyst module is configured to cooperate with the one or more AI models trained on how the human cyber security analysts conduct cyber investigations to form one or more hypotheses on potential cyber threats that could have this chain of potentially related information under analysis, where the cyber threat analyst module is configured to perform additional rounds of gathering additional information in order to refute or to support each of the one or more hypotheses to re-check cyber threat indications for the chain of potentially related information under analysis until the one or more hypotheses on potential cyber threats are one of refuted, supported, or included in the report that includes details of activities assessed to be relevant activities to the anomaly of interest to the user, and that also conveys at least a first hypothesis is neither supported or refuted; and thus, needs a human to further investigate the anomaly of interest.

6. The Artificial Intelligence based cyber security system of claim 1, further comprising:

where the cyber threat analyst module is further configured to cooperate with a first Artificial Intelligence model trained to model the normal pattern of life for entities in the wireless domain supplied by the wireless sensors as well as a second Artificial Intelligence model trained to model the normal pattern of life for entities in the second domain from the probes from the second domain in order to autonomously investigate a combined activity from the wireless domain and activity from the second domain in order to support or refute one or more cyber threat hypotheses on whether the cyber threat has been detected, where the coordinator module is configured to assess activity including events occurring in the second domain compared to activity occurring in the wireless domain, where the first Artificial Intelligence model and the second Artificial Intelligence model are part of the one or more Artificial Intelligence models; and where the cyber threat analyst module is configured to form and investigate the cyber threat hypotheses on what are a possible set of cyber threats, where the cyber threat analyst module is also configured to cooperate with one or more AI models trained on how human cyber security analysts conduct an investigation on a possible set of cyber threats hypotheses that would include at least the anomaly of interest, one or more scripts outlining how to conduct an investigation on a possible set of cyber threats hypotheses that would include at least the anomaly of interest, one or more rules based models on an investigation on a possible set of cyber threats hypotheses how to conduct an investigation on a possible set of cyber threats hypotheses that would include at least the anomaly of interest, and any combination of these, where the anomaly of interest was identified through cooperation with one or more AI models trained with machine learning on the normal pattern of life in the wireless domain.

7. The Artificial Intelligence based cyber security system of claim 1, further comprising:

where a first wireless sensor is configured to have two or more Radio Frequency protocol adapters in order to be able to monitor the wireless transmissions in the airspace in the wireless domain consisting of various types of wireless transmissions both 1) a first type of wireless transmissions in a first known radio frequency protocol at a standard frequency range dictated by that first Radio Frequency protocol through to 2) a second known radio frequency protocol at a standard frequency range dictated by that second Radio Frequency protocol.

8. The Artificial Intelligence based cyber security system of claim 7, where the two or more Radio Frequency protocol adapters are configured to include two or more Radio Frequency protocols from i) a WiFi protocol transmitted on 2.4 GHz channel, ii) a WiFi protocol transmitted on and 5 GHz channel, iii) a ZigBee or other mesh network protocol transmitted on a 2.4 GHz channel, iv) a ZigBee or other mesh network protocol transmitted on a 900 MHz channel, v) a ZigBee or other mesh network protocol transmitted on an 868 MHz channel; vi) a 4G protocol transmitted on a 600 MHz channel, vii) a 4G protocol transmitted on a 700 MHz channel, viii) a 4G protocol transmitted on a 1.7 GHZ channel, ix) a 4G protocol transmitted on a 2.1 GHz channel, x) a 4G protocol transmitted on a 2.3 GHZ channel, xi) a 4G protocol transmitted on a 2.5 GHz channel; xii) a 5G protocol in a first frequency range from 450 MHz to 6 GHZ, xiii) a 5G protocol in a second frequency range from 24.25 GHz to 52.6 GHZ, as well as xiv) a Z-Wave protocol transmitted on an 800-900 MHz frequency range, and
    where each different radio frequency protocol adapter is configured both i) to understand one or more particular radio frequency protocols and ii) to have one or more frequency filters, where a first radio frequency protocol adapter is configured to cooperate with one or more antennas in the first wireless sensor to capture the wireless transmissions in the one or more particular radio frequency protocols.

9. The Artificial Intelligence based cyber security system of claim 1, further comprising:
    where a first wireless sensor has one or more radio frequency adapters that have wireless receivers configured to pull down raw data information from a first wireless transmission in the airspace in the wireless domain as well as one or more algorithms, a memory, and one or more processors, configured to then make an initial meta data analysis of the first wireless transmission in the airspace in the wireless domain.

10. A method for an Artificial Intelligence based cyber security system, comprising:
    configuring a coordinator module, a cyber threat analyst module, and one or more Artificial Intelligence models trained to model a normal pattern of life for entities in a wireless domain and a normal pattern of life for entities in a second domain to cooperate with a combination of 1) wireless sensors with one or more Radio Frequency protocol adapters to monitor and analyze wireless activity, including wireless transmissions transmitted through airspace in the wireless domain, and 2) probes to monitor activity in the second domain, which includes any of i) an Information Technology network, ii) an Operational Technology network, iii) a Cloud service, iv) a SaaS service, v) an endpoint device, and vi) an email domain in order to analyze at least an anomaly of interest in one of 1) the wireless activity from the wireless sensors in view of the activity in the second domain from the probes, 2) the activity from the second domain from the probes in view of the wireless activity in the wireless domain from the wireless sensors, and 3) and any combination of both in order for the coordinator module, the cyber threat analyst module, and the one or more Artificial Intelligence models to cooperate to analyse the anomaly of interest in a wider view of another domain's activity;
    configuring the coordinator module and the cyber threat analyst module to cooperate to understand and assess the wireless activity from the wireless sensors as well as the activity from the second domain from the probes from the second domain in light of the one or more Artificial Intelligence models trained to model a normal pattern of life for entities in the wireless domain and a normal pattern of life for entities in a second domain in order to detect a cyber threat indicated by at least by the anomaly of interest, where the coordinator module and the cyber threat analyst module are implemented in hardware electronic components, software components, and any combination of both;
    configuring a formatting model to generate at least one of i) an alert to a user and ii) a report that includes details of activities assessed to be relevant activities to the anomaly of interest to the user when a possibility of the cyber threat is above a threshold based upon input from the cyber threat analyst module, where the formatting model is configured to deliver at least one of the alert and the report via a medium of at least one of 1) a printable report, 2) presented digitally on a graphical user interface, 3) presented digitally in an email on a display, 4) presented digitally in a message on the display, and 5) in a machine readable format for further reinforcement of machine learning, where the Artificial Intelligence models and the formatting model are implemented in hardware electronic components, software components, and any combination of both;
    configuring where the coordinator module, the cyber threat analyst module, the formatting module, and the one or more Artificial Intelligence models trained to model the normal pattern of life for entities in the wireless domain and the normal pattern of life for entities in the second domain to be located in a cyber security appliance;
    configuring the formatting module to generate the alert to the user on a user interface of at least one of the cyber security appliance and a device associated with the user, whenever the anomaly of interest is a suspicious wireless transmission in the airspace from at least one of 1) transmitted from a wireless transmitter device, which was not known previously to the Artificial Intelligence models trained to model the normal pattern of life for entities in the wireless domain, and 2) transmitted from a known wireless transmitter device, which is known previously to the Artificial Intelligence models trained to model the normal pattern of life for entities in the wireless domain, but is interacting with a wireless network that is not normally part of the wireless domain being protected by the cyber security system; as well as
    configuring the coordinator module to determine how links exist between the wireless activities that include alerts, events and the suspicious wireless transmission, from the wireless domain to the activities that include alerts and events from the second domain supplied by the probes.

11. The method for the Artificial Intelligence based cyber security system of claim 10, further comprising:
    where the anomaly of interest is the suspicious wireless transmission in the airspace from at least one of 1) transmitted from a wireless transmitter device, which was not known previously to the Artificial Intelligence models trained to model a normal pattern of life for entities in the wireless domain, and 2) transmitted in a frequency range not within frequency ranges associated with WiFi protocol standards known by the Artificial Intelligence models trained to model a normal pattern of life for entities in the wireless domain; and configuring a portable hunter device having one or more wireless receivers to allow an operator to physically move with the portable hunter device to determine a physical location of a wireless transmission source of the suspicious wireless transmission.

12. The method for the Artificial Intelligence based cyber security system of claim 10, further comprising:

configuring the Artificial Intelligence models to use at least an unsupervised machine learning algorithm to update a training data for the Artificial Intelligence models trained to model a normal pattern of life in light of the wireless activity supplied by the wireless sensors;

where the anomaly of interest is a suspicious wireless transmission in the airspace from at least one of 1) transmitted from a wireless transmitter device, which was not known previously to the Artificial Intelligence models trained to model a normal pattern of life for entities in the wireless domain, and 2) transmitted from a known wireless transmitter device, which is known previously to the Artificial Intelligence models trained to model the normal pattern of life for entities in the wireless domain, but is interacting with a wireless network that is not normally part of the wireless domain being protected by the cyber security system;

configuring a portable hunter device having one or more wireless receivers to cooperate with the one or more wireless sensors to find a physical location of the wireless transmitter device; and configuring the portable hunter device to use 1) a location of a wireless sensor closest to the suspicious wireless transmission in the airspace that is the anomaly of interest and 2) identifying details of the suspicious wireless transmission in the airspace that is the anomaly of interest in order to indicate a general geographical area of where a wireless transmission source of the suspicious wireless transmission could be in order to assist the portable hunter device in finding an exact physical location of the wireless transmitter device.

13. The method for the Artificial Intelligence based cyber security system of claim 10, further comprising:

where the anomaly of interest is a suspicious wireless transmission from a wireless transmission source;

configuring a portable hunter device to have one or more wireless receivers, one or more antennas, one or more Radio Frequency protocol adapters, a battery, a directional indicator to the wireless transmission source as well as a signal strength of the suspicious wireless transmission that is the anomaly of interest from the wireless transmission source; and configuring the portable hunter device to factor in at least one of i) an increase of signal strength of the suspicious wireless transmission, ii) a decrease of signal strength of the suspicious wireless transmission that is the anomaly of interest from the wireless transmission source, and iii) any combination of both in determining a physical location of the wireless transmission source.

14. The method for the Artificial Intelligence based cyber security system of claim 10, further comprising:

configuring the cyber threat analyst module to cooperate with one or more AI models trained on how human cyber security analysts conduct cyber investigations to conduct initial investigations regarding at least the anomaly of interest, and then to collect additional information to form a chain of potentially related information under analysis from either prior wireless transmissions and/or activity from the second domain that have a probability above a threshold of a logical nexus to the anomaly of interest;

configuring the cyber threat analyst module to cooperate with the one or more AI models trained on how the human cyber security analysts conduct cyber investigations to form one or more hypotheses on potential cyber threats that could have this chain of potentially related information under analysis; and configuring the cyber threat analyst module to perform additional rounds of gathering additional information in order to refute or to support each of the one or more hypotheses to re-check cyber threat indications for the chain of potentially related information under analysis until the one or more hypotheses on potential cyber threats are one of refuted, supported, or included in the report that includes details of activities assessed to be relevant activities to the anomaly of interest to the user but that also conveys at least a first hypothesis is neither supported or refuted; and thus, needs a human to further investigate the anomaly of interest.

15. The method for the Artificial Intelligence based cyber security system of claim 10, further comprising:

configuring the cyber threat analyst module to cooperate with a first Artificial Intelligence model trained to model the normal pattern of life for entities in the wireless domain supplied by the wireless sensors as well as a second Artificial Intelligence model trained to model the normal pattern of life for entities in the second domain from the probes from the second domain in order to autonomously investigate a combined activity from the wireless domain and activity from the second domain in order to support or refute one or more cyber threat hypotheses on whether the cyber threat has been detected, where the first Artificial Intelligence model and the second Artificial Intelligence model are part of the one or more Artificial Intelligence models;

configuring where the coordinator module to assess activity including events occurring in the second domain compared to activity occurring in the wireless domain; and configuring the cyber threat analyst module to form and investigate the cyber threat hypotheses on what are a possible set of cyber threats, where the cyber threat analyst module is also configured to cooperate with one or more AI models trained on how human cyber security analysts conduct an investigation on a possible set of cyber threats hypotheses that would include at least the anomaly of interest, one or more scripts outlining how to conduct an investigation on a possible set of cyber threats hypotheses that would include at least the anomaly of interest, one or more rules based models on an investigation on a possible set of cyber threats hypotheses how to conduct an investigation on a possible set of cyber threats hypotheses that would include at least the anomaly of interest, and any combination of these, where the anomaly of interest was identified through cooperation with one or more AI models trained with machine learning on the normal pattern of life in the wireless domain.

16. The method for the Artificial Intelligence based cyber security system of claim 10, further comprising:

configuring a first wireless sensor to have two or more Radio Frequency protocol adapters in order to be able to monitor the wireless transmissions in the airspace in the wireless domain consisting of various types of wireless transmissions both 1) a first type of wireless transmissions in a first known radio frequency protocol at a standard frequency range dictated by that first Radio Frequency protocol through to 2) a second known radio frequency protocol at a standard frequency range dictated by that second Radio Frequency protocol.

17. The method for the Artificial Intelligence based cyber security system of claim 10, further comprising:

configuring a first wireless sensor to have one or more radio frequency adapters that have wireless receivers configured to pull down raw data information from a first wireless transmission in the airspace in the wireless domain as well as one or more algorithms, a memory, and one or more processors, configured to then make an initial meta data analysis of the first wireless transmission in the airspace in the wireless domain.

18. A machine readable medium configured to store instructions and data to be executed by one or more processors, where the instructions when executed cause a cyber security appliance to perform steps as follows, comprising:

causing a coordinator module, a cyber threat analyst module, and one or more Artificial Intelligence models trained to model a normal pattern of life for entities in a wireless domain and a normal pattern of life for entities in a second domain to cooperate with a combination of 1) wireless sensors with one or more Radio Frequency protocol adapters to monitor and analyze wireless activity, including wireless transmissions transmitted through airspace in the wireless domain, and 2) probes to monitor activity in the second domain, which includes any of i) an Information Technology network, ii) an Operational Technology network, iii) a Cloud service, iv) a SaaS service, v) an endpoint device, and vi) an email domain in order to analyze at least an anomaly of interest in one of 1) the wireless activity from the wireless sensors in view of the activity in the second domain from the probes, 2) the activity from the second domain from the probes in view of the wireless activity in the wireless domain from the wireless sensors, and 3) and any combination of both in order for the coordinator module, the cyber threat analyst module, and the one or more Artificial Intelligence models to cooperate to analyse the anomaly of interest in a wider view of another domain's activity;

causing the coordinator module and the cyber threat analyst module to cooperate to understand and assess the wireless activity from the wireless sensors as well as the activity from the second domain from the probes from the second domain in light of the one or more Artificial Intelligence models trained to model a normal pattern of life for entities in a wireless domain and a normal pattern of life for entities in a second domain in order to detect a cyber threat indicated by at least by the anomaly of interest, where the coordinator module and the cyber threat analyst module are implemented in hardware electronic components, software components, and any combination of both;

causing a formatting model to generate at least one of i) an alert to a user and ii) a report that includes details of activities assessed to be relevant activities to the anomaly of interest to the user when a possibility of the cyber threat is above a threshold based upon input from the cyber threat analyst module, where the formatting model is configured to deliver at least one of the alert and the report via a medium of at least one of 1) a printable report, 2) presented digitally on a graphical user interface, 3) presented digitally in an email on a display, 4) presented digitally in a message on the display, and 5) in a machine readable format for further reinforcement of machine learning, where the Artificial Intelligence models and the formatting model are implemented in hardware electronic components, software components, and any combination of both;

causing a cyber threat analyst module to cooperate with one or more AI models trained on how human cyber security analysts conduct cyber investigations to conduct initial investigations regarding at least the anomaly of interest, and then to collect additional information to form a chain of potentially related information under analysis from either prior wireless transmissions and/or activity from the second domain that have a probability above a threshold of a logical nexus to the anomaly of interest;

causing the cyber threat analyst module to cooperate with the one or more AI models trained on how the human cyber security analysts conduct cyber investigations to form one or more hypotheses on potential cyber threats that could have this chain of potentially related information under analysis; and causing the cyber threat analyst module to perform additional rounds of gathering additional information in order to refute or to support each of the one or more hypotheses to re-check cyber threat indications for the chain of potentially related information under analysis until the one or more hypotheses on potential cyber threats are one of refuted, supported, or included in the report that includes details of activities assessed to be relevant activities to the anomaly of interest to the user but that also conveys at least a first hypothesis is neither supported or refuted; and thus, needs a human to further investigate the anomaly of interest.

* * * * *